(12) United States Patent
Matsumoto et al.

(10) Patent No.: US 8,186,244 B2
(45) Date of Patent: May 29, 2012

(54) TRANSMISSION CASING FOR BICYCLE

(75) Inventors: Shinya Matsumoto, Saitama (JP);
Kazutoyo Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1125 days.

(21) Appl. No.: 11/053,903

(22) Filed: Feb. 10, 2005

(65) Prior Publication Data

US 2005/0172756 A1    Aug. 11, 2005

(30) Foreign Application Priority Data

Feb. 10, 2004  (JP) .................................. 2004-034307

(51) Int. Cl.
*F16H 57/02*  (2006.01)
*F16H 57/04*  (2010.01)
*F16H 61/00*  (2006.01)
(52) U.S. Cl. .................................................. 74/606 R
(58) Field of Classification Search ................ 74/606 R; 310/68 R, 67 R, DIG. 6; 180/65.8; 49/352; 475/342; B62M 23/02
See application file for complete search history.

(56) References Cited

U.S. PATENT DOCUMENTS

| | | | | | |
|---|---|---|---|---|---|
| 3,724,599 | A | * | 4/1973 | Heidacker | 184/6.5 |
| 4,122,730 | A | * | 10/1978 | Weiland | 74/606 R |
| 4,216,624 | A | * | 8/1980 | Blankenburg et al. | 49/352 |
| 4,260,143 | A | * | 4/1981 | Kliger | 267/148 |
| 4,380,483 | A | * | 4/1983 | Kliger | 156/169 |
| 5,171,195 | A | * | 12/1992 | Funamoto | 475/342 |
| 5,567,296 | A | * | 10/1996 | Luch | 205/158 |
| 5,702,993 | A | * | 12/1997 | Kubomura et al. | 442/204 |
| 6,131,543 | A | * | 10/2000 | Achenbach et al. | 123/195 C |
| 6,338,688 | B1 | * | 1/2002 | Minami et al. | 474/144 |
| 6,431,026 | B1 | * | 8/2002 | Walther et al. | 74/606 R |
| 6,836,037 | B1 | * | 12/2004 | Tsuboi | 310/68 R |
| 2004/0009728 | A1 | * | 1/2004 | Kubomura et al. | 442/205 |
| 2004/0118240 | A1 | * | 6/2004 | Young | 74/606 R |

(Continued)

FOREIGN PATENT DOCUMENTS

EP    1 092 618 A2 *   4/2001

(Continued)

OTHER PUBLICATIONS

The World Book Encyclopedia, World Book, Inc., 1988, pp. 560-566.*

(Continued)

*Primary Examiner* — Vinh T. Luong
(74) *Attorney, Agent, or Firm* — Birch, Stewart, Kolasch & Birch, LLP

(57) ABSTRACT

A transmission casing for a bicycle has sufficient strength and rigidity and has a simple structure while being capable of hermetically sealing a transmission body of the bicycle. In a transmission casing for a bicycle is covered with a casing and a plurality of transmission shafts supported by the casing. The transmission casing includes a light-metal-made reinforcing member made of aluminum, a light alloy or the like which supports shaft portions of the plurality of transmission shafts, and a fiber-reinforced-plastic-made cover member which is integrally laminated to an inner surface of the light-metal-made reinforcing member so as to hermetically seal the transmission body. The light-metal-made reinforcing member has a strength necessary for supporting the plurality of transmission shafts, and the fiber-reinforced-plastic-made cover member has a residual rigidity by subtracting rigidity obtained by the metal-made-reinforcing member from the rigidity necessary for preventing the deformation of the whole casing.

12 Claims, 29 Drawing Sheets

U.S. PATENT DOCUMENTS

| | | | |
|---|---|---|---|
| 2004/0185733 A1 * | 9/2004 | Murai et al. | 442/265 |
| 2005/0097984 A1 * | 5/2005 | Davis et al. | 74/606 R |

FOREIGN PATENT DOCUMENTS

| | | | |
|---|---|---|---|
| EP | 1 110 856 A2 * | 6/2001 | |
| EP | 1 564 130 A1 * | 8/2005 | 74/606 R |
| FR | 2 931 220 * | 11/2009 | |
| JP | 63-225738 * | 9/1988 | |
| JP | 6-86405 * | 3/1994 | |
| JP | 7-284198 * | 10/1995 | |
| JP | 8-216969 * | 8/1996 | |
| JP | 10-167160 A1 * | 6/1998 | |
| JP | 11-049064 A | 2/1999 | |
| JP | 2001-180565 A | 7/2001 | |
| JP | 2003-164104 * | 6/2003 | |
| JP | 2004-299676 A | 10/2004 | |
| JP | 2005-150668 * | 6/2005 | |

OTHER PUBLICATIONS

Machine Translation of JP 11-049064, Sano et al., Feb. 23, 1999.*

* cited by examiner

8,186,244 B2

TRANSMISSION CASING FOR BICYCLE

CROSS-REFERENCE TO RELATED APPLICATIONS

The present application claims priority under 35 USC 119 to Japanese Patent Application No. 2004-034307 filed on Feb. 10, 2004 the entire contents of which are hereby incorporated by reference.

BACKGROUND OF THE INVENTION

1. Field of the Invention

The present invention relates to a transmission casing for a bicycle which hermetically seals a transmission body of a bicycle.

2. Description of Background Art

JP-A-2001-180565 discloses a transmission casing which includes an integrally coupled resin-made casing body 70 which is divided into three parts in the vehicle-width direction. A transmission body is hermetically sealed by the transmission casing.

Further, on the above-mentioned transmission casing, a crankshaft 101, a motor shaft 116 and an output shaft 47 are rotatably supported.

In the above-mentioned transmission casing, metal-made reinforcing members 105 which bear an inter-axis force working between the crankshaft 101 and the motor shaft 116 are integrally molded to the inside of the resin-made casing body 70 at the time of molding the casing.

However, in the transmission casing described in JP-A-2001-180565, the constitutional ratio of the resin and the reinforcing member which takes the strength and the rigidity of the whole transmission casing into consideration is not adopted. Thus, respective constitutions which may be optimum for the reduction of weight are not particularly considered. Further, with respect to a situation in which the transmission casing includes a large number of transmission shafts such as a derailleur shaft, a transmission shaft and the like in addition to the crankshaft, the motor shaft and the output shaft, it is necessary to integrally mold the metal-made reinforcing member over the whole transmission casing. Accordingly, as a matter of course, the weight of the transmission casing per se is increased and at the same time, the structure becomes complicated.

SUMMARY AND OBJECTS OF THE INVENTION

The present invention has been made to overcome the above-mentioned drawbacks.

The present invention is directed to a transmission casing for a bicycle in which a transmission body of a bicycle is covered with a casing and a plurality of transmission shafts are supported by the casing. The transmission casing includes a light-metal-made reinforcing member made of aluminum, a light alloy or the like which supports shaft portions of the plurality of transmission shafts. A fiber-reinforced-plastic-made cover member is integrally laminated to an inner surface of the light-metal-made reinforcing member so as to hermetically seal the transmission body. The light-metal-made reinforcing member has the strength necessary for supporting the plurality of transmission shafts. The fiber-reinforced-plastic-made cover member has a residual rigidity by subtracting the rigidity obtained by the metal-made-reinforcing member from rigidity necessary for preventing the deformation of the whole casing.

The present invention includes a thickness of the fiber-reinforced-plastic made cover member that is set to a value which falls within a range of 0.7 to 1.5 mm and, at the same time, the light-metal-made reinforcing member has at least a portion thereof formed thicker than the cover member.

The present invention provides a transmission casing that is divided into left and right transmission casings using an approximately center portion of the transmission casing in the vehicle width direction as a boundary. The left and right divided transmission casings are integrally coupled to each other using screw members such as bolts and nuts at a plurality of portions on an outer peripheral portion of the transmission casing. At the same time, the transmission casing is coupled to a body of the bicycle at a plurality of given portions out of the plurality of portions.

The present invention includes fiber-reinforced-plastic-made strip bodies that are integrally attached to the whole circumference of inner surfaces of outer peripheries of the fiber-reinforced-plastic-made cover members of the left and right divided transmission casings. A sealing member is fitted in a groove portion which is formed between an outer peripheral portion of the fiber-reinforced-plastic-made cover member in either one of the left and right divided transmission casings and an outer peripheral portion of the fiber-reinforced-plastic-made strip body. An outer peripheral portion of the fiber-reinforced-plastic-made cover member in another divided transmission casing of a left and right divided transmission casings is brought into contact with the sealing member.

According to the present invention, the strength which is necessary for firmly supporting the plurality of transmission shafts is obtained from the above-mentioned light-metal-made reinforcing member. At the same time, the rigidity necessary for preventing the deformation of the whole casing is obtained from the fiber-reinforced-plastic-made cover member which is integrally laminated to the inner surface of the light-metal-made reinforcing member. Accordingly, it is possible to manufacture the transmission casing which can hermetically seal the transmission body, is light in weight and has a high strength and a high rigidity and can be manufactured at a low cost.

According to the present invention, by changing the thickness of the above-mentioned fiber-reinforced-plastic-made cover, it is possible to obtain the rigidity necessary for the transmission casing. At the same time, by changing the thickness of the above-mentioned light-metal-made reinforcing member, it is possible to obtain the strength necessary for firmly supporting the plurality of transmission shafts. Further, it is possible to set the rigidity and the strength of the transmission casing to optimum values corresponding to a type of bicycle or a traveling condition with a proper balance.

According to the present invention, the above-mentioned transmission casing is easily removable from the bicycle body by removing the screw members and, at the same time, can be disassembled into left and right parts. Thus, the maintenance and the inspection of the transmission can be performed easily.

According to the present invention, the inside of the transmission casing can be completely sealed by means of the sealing member and, at the same time, since the outer peripheral portions of the above-mentioned left and right two-split fiber-reinforced-plastic-made cover members can be brought into contact with each other. Thus, the rigidity of the transmission casing can be further enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of a transmission according to the present invention illustrated in FIG. 1 to FIG. 21 will be hereinafter explained.

Figure 1:
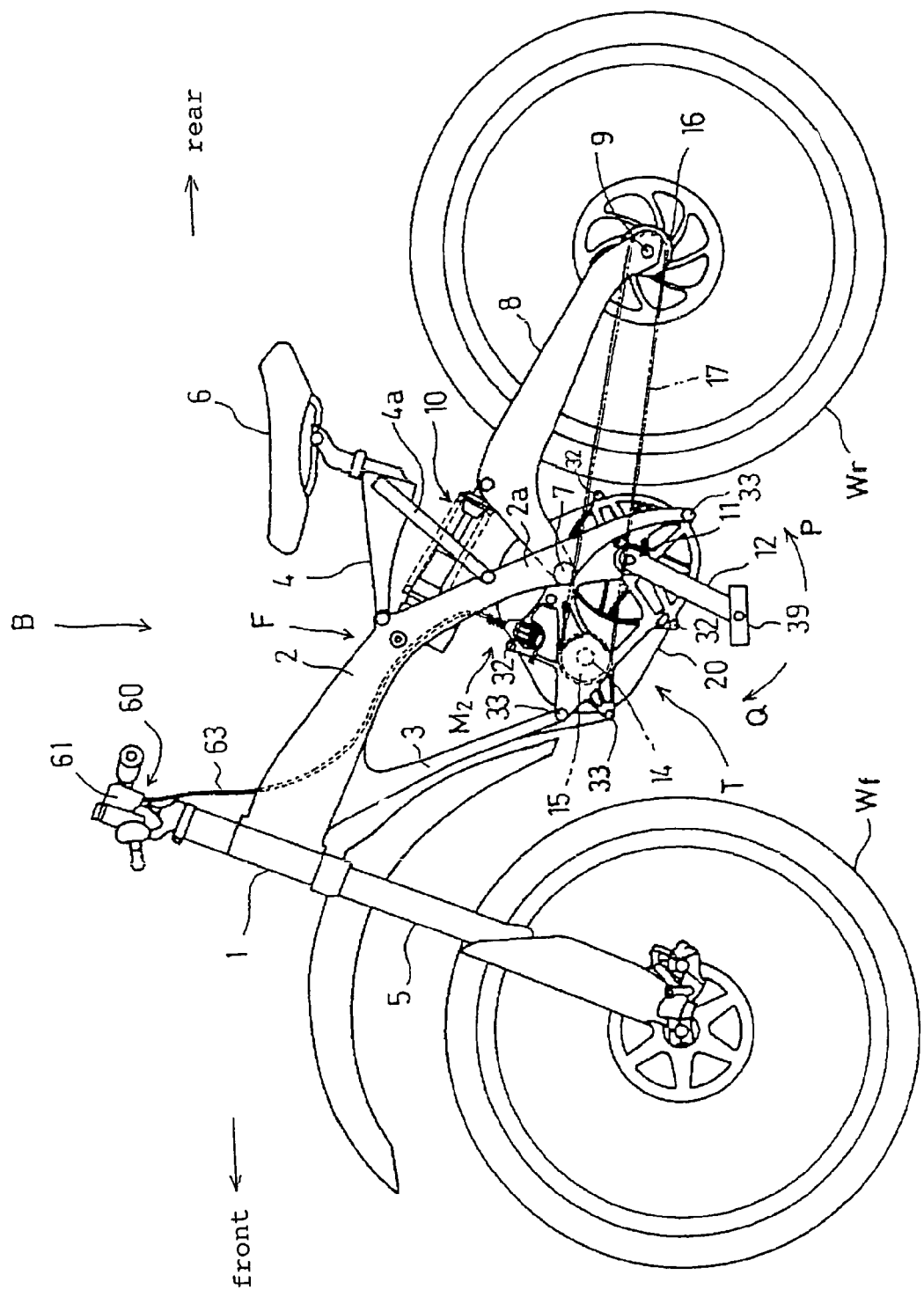
FIG. 1 is a schematic left side view of a bicycle according to one embodiment of the present invention.

FIG. 1 is a left side view of a bicycle B in which the transmission according to the present invention is used. The bicycle is a downhill bicycle and is used in a competition wherein players compete against time for descending an unpaved course which includes high-speed corners and jump sections in a woodland path or the like.

A vehicle body frame F of the bicycle B includes a pair of left and right main frames 2 which extend rearwardly, obliquely and downwardly from a head pipe 1, a down tube 3 which extends rearwardly, obliquely and downwardly from front end portions of both main frames 2 below the front end portions, and a saddle frame 4 which extends rearwardly from center portions of respective main frames 2.

The saddle frame 4 which supports a saddle 6 is supported on a stay 4a which is interposed between the saddle frame 4 and the main frames 2.

The head pipe 1 steerably supports a pair of left and right front forks 5 and a front wheel Wf is pivotally supported on lower end portions of the front forks 5.

Hereinafter, "up-and-down", "front-and-rear" and "left-and-right" are determined using the bicycle as the reference with respect to "up-and-down," "front-and-rear" and "left-and-right" of the bicycle. Further, the side viewing implies the viewing in the left-and-right direction.

Figure 5:
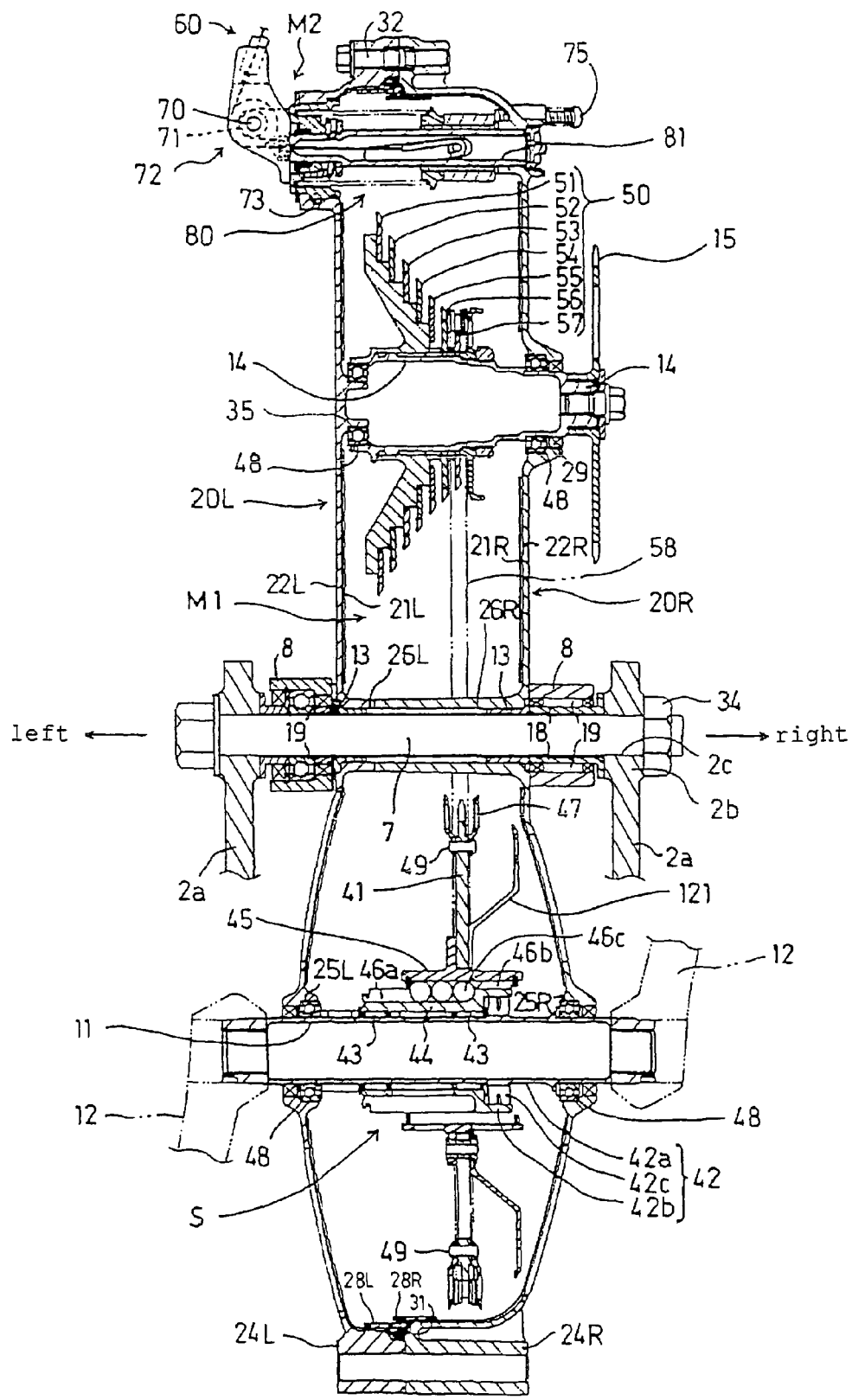
FIG. 5 is a cross-sectional view taken along a line V-V in FIG. 4.

On a pivot shaft 7 which is provided to a rear portion of the left and right main frames 2 illustrated in FIG. 1, as shown in FIG. 5, front end portions of a pair of left and right swing arms 8 are tiltably and pivotally supported in a state wherein the swing arms 8 are arranged close to respective inner side surfaces of the pair of left and right main frames 2. On rear end portions of the swing arms 8, a rear wheel Wr which is positioned between the pair of left and right main frames 8 is pivotally supported by way of an axle 9.

The pair of left and right swing arms 8 are, as shown in FIG. 1, connected with the pair of left and right main frames 2 by way of a suspension 10 which has a compression spring and a damper, the pair of left and right swing arms 8 are tiltable in the up-and-down direction about the pivot shaft 7.

A power transmission unit which includes a crankshaft 11, a transmission T and a drive force transmission mechanism which transmits a drive force to the rear wheel Wr is provided on the bicycle B.

As shown in FIG. 1, below the vehicle body frame F and between rear portions of both main frames 2 and the rear portion of the down tube 3, a crankshaft 11 and the transmission T are arranged. On a right side of the bicycle B, a mechanism which transmits the drive force from the transmission T to the rear wheel Wr, that is, the drive force transmission mechanism which includes a rear wheel drive sprocket wheel 15, a rear wheel driven sprocket wheel 16 and an endless rear wheel drive chain 17 which extend between and are wound around both sprocket wheels, is arranged on a right side of a vehicle-body-width-direction center line.

Figure 2:
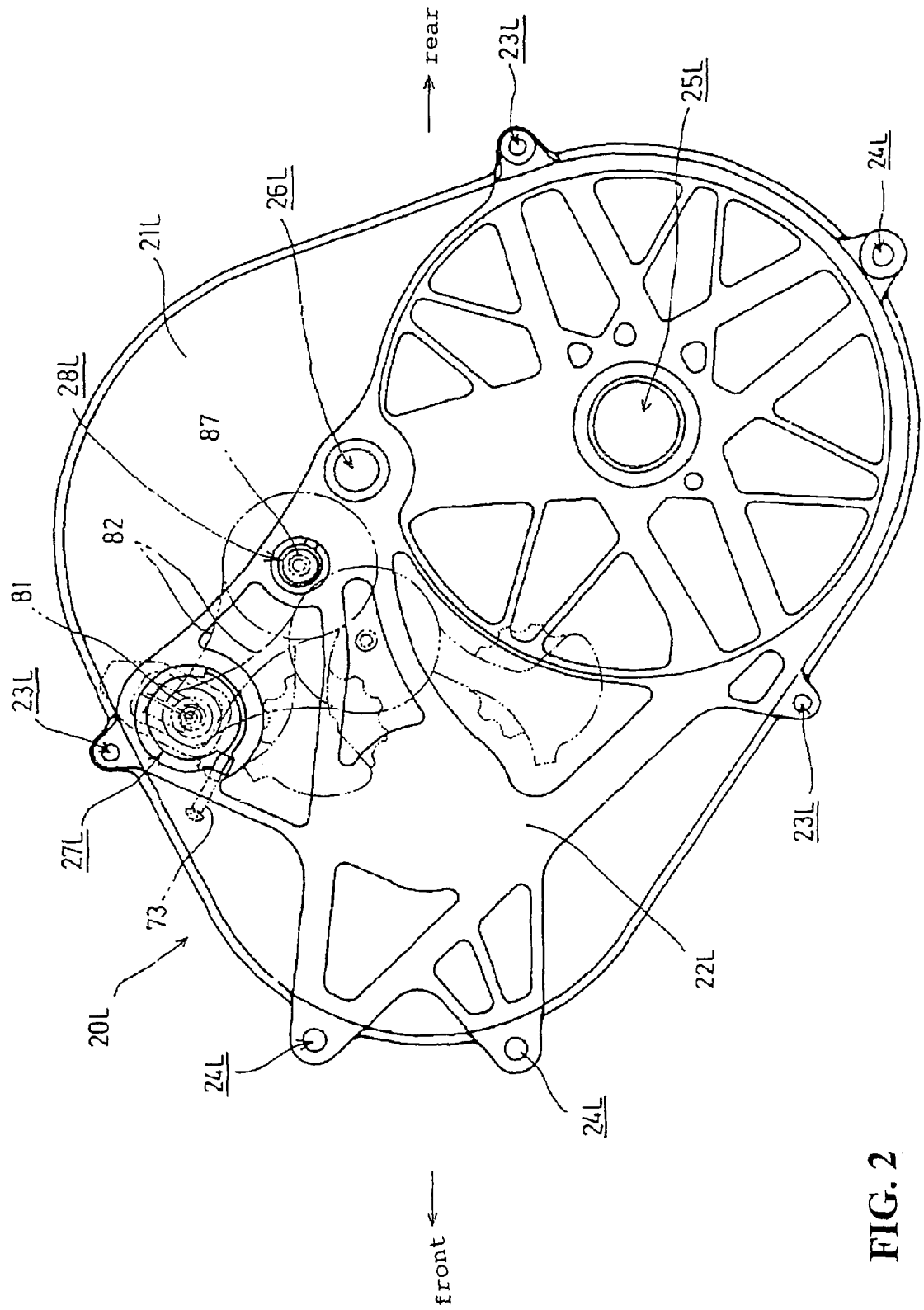
FIG. 2 is a left side view of a left casing.
Figure 3:
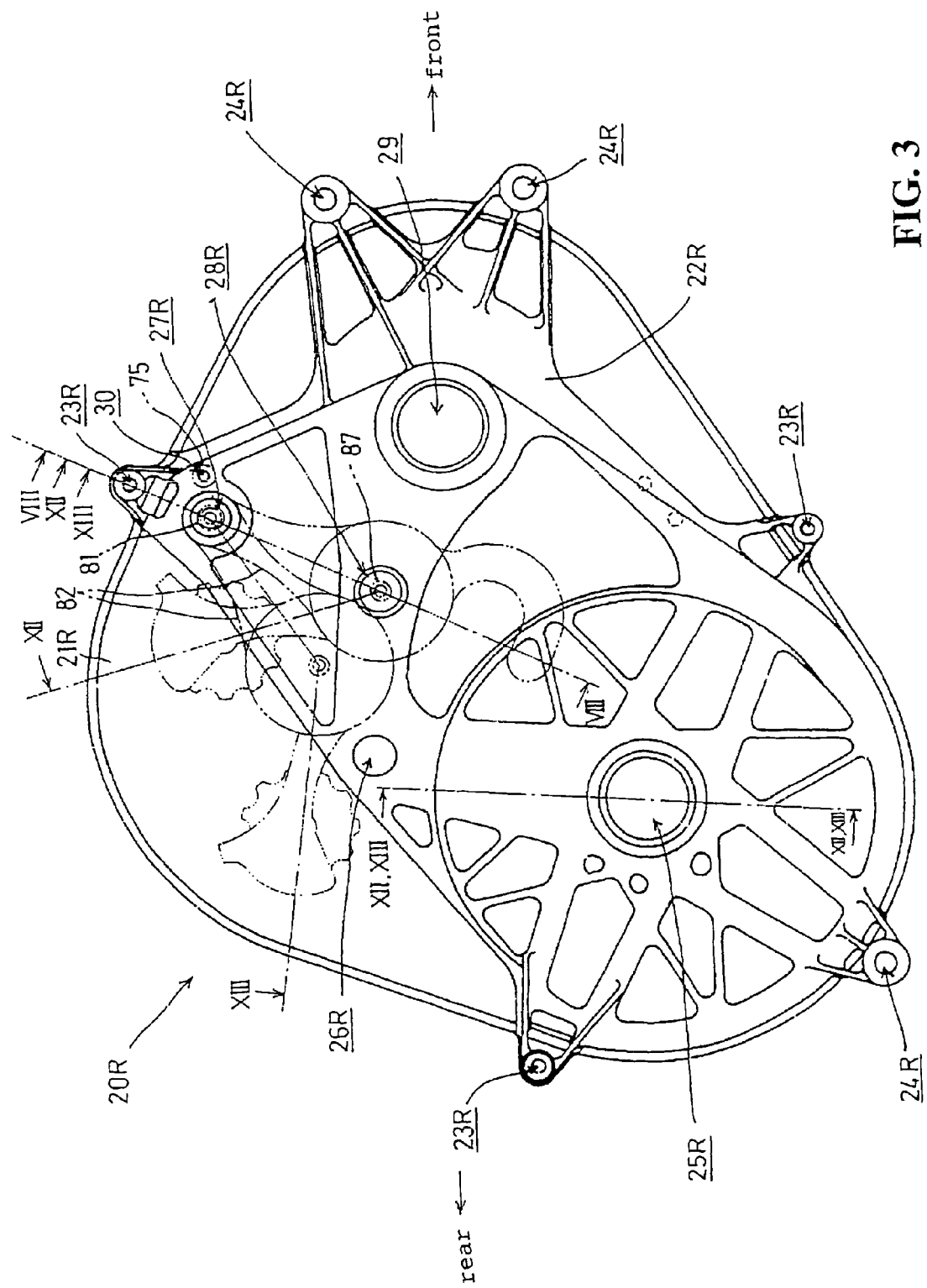
FIG. 3 is a right side view of a right casing.

A casing 20 of the transmission T, as shown in FIG. 2, FIG. 3 and FIG. 5, includes a left casing 20L and a right casing 20R which are divided or split in the left-and-right direction and are merged together. Outer side views of the left and right casings 20L, 20R are illustrated in FIG. 2 and FIG. 3.

The left and right casings 20L, 20R include a left cover 21L and a right cover 21R made of CFRP (carbon fiber reinforced plastic) which respectively incorporate inner units therein and a left reinforcing member 22L and a right reinforcing member 22R which reinforce the left and right covers 21L, 21R from the outside. Here, the left cover 21L is adhered to the inside of the left reinforcing member 22L and the right cover 21R is adhered to the inside of the right reinforcing member 22R.

Figure 8:
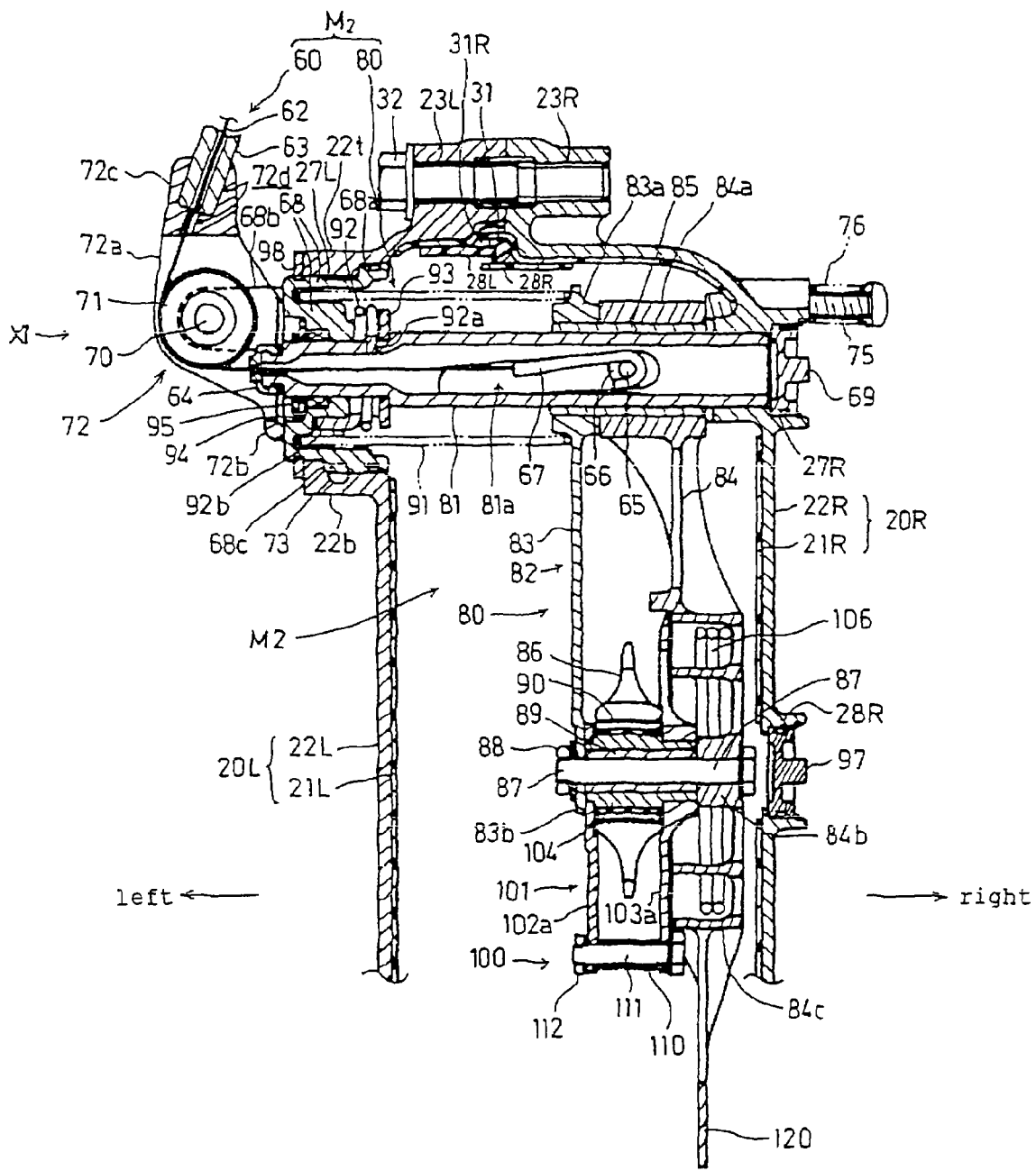
FIG. 8 is a cross-sectional view taken along a line VIII-VIII in FIG. 3.

The left and right covers 21L, 21R, as shown in FIG. 8, abut relative to each other with a sealing member 31 inserted between mating surfaces thereof and are fastened and are integrally formed by bolts 32, 33 which are inserted into bolt holes 23L, 23R, 24L, 24R formed in outer peripheral projecting portions of the left and right reinforcing members 22L, 22R which sandwich the left and right covers 21L, 21R.

Also shown in FIG. 1 along with FIG. 2 and FIG. 3, by inserting the bolts 32 into three bolt holes 23L, 23R provided to each one of the left and right sides, the left and right reinforcing members 22L, 22R are merged and fastened together. On the other hand, out of another three bolt holes 24L, 24R provided to each one of left and right sides, two front bolt holes 24L, 24R are fastened together to a lower end of the down tube 3 by inserting the bolts 33 and one rear bolt hole 24L, 24R is fastened together to lower ends of the main frames 2 by inserting a bolt.

That is, the bolt holes 24L, 24R have not only the function of fastening the left and right casings 20L, 20R by inserting the bolts 33 but also the function of mounting the transmission T to the main frames 2 and the down tube 3 of the vehicle.

In lower portions of the left and right reinforcing members 22L, 22R of the casing 20, as shown in FIG. 5, crankshaft receiving holes 25L, 25R are formed with the crankshaft 11 penetrating the crankshaft receiving holes 25L, 25R in the left-and-right direction. In addition, pivot bearing holes 26L, 26R are provided which allow the pivot shaft 7 to penetrate therethrough. The pivot bearing holes 26L, 26R are formed above the crankshaft receiving holes 25L, 25R.

Further, as shown in FIG. 2, with respect to the left reinforcing member 22L, a derailleur bearing hole 27L for a derailleur shaft 81 which will be describe later and a peeping hole 28L which is spaced apart from the bearing hole 27L are formed in an upper portion thereof. On the other hand, as shown in FIG. 3, with respect to the right reinforcing member 22R, a derailleur bearing hole 27R which faces the derailleur bearing hole 27L in an opposed manner and a peeping hole 28R which is spaced apart from the derailleur bearing hole 27L are formed in an upper portion thereof. Further, an output bearing hole or aperture 29 is formed in a front portion of the right reinforcing member 22R.

Here, the left and right peeping holes 28L, 28R are not arranged at positions where the left and right peeping holes 28L, 28R face each other in an opposed manner but are arranged at given rotational angular positions about the derailleur bearing holes 27L, 27R. An inner diameter of the left and right peeping holes 28L, 28R is slightly larger than a diameter of guide pulley support shafts 87 to facilitate the viewing of the guide pulley support shafts 87, and is largely smaller than an outer diameter of the guide pulleys 86. This is because that by preventing the inner diameter of the left and right peeping holes 28L, 28R from being excessively enlarged, the rigidity of the casing 20 can be ensured.

Further, as shown in FIG. 3, a stopper bolt hole 30 is formed in the vicinity of the derailleur bearing hole 27R of the right reinforcing member 22R.

The above-mentioned left and right reinforcing members 22L, 22R are merged with the left and right covers 21L, 21R and, thereafter, are fastened by the bolts 32, 33 thus constituting the casing 20 of the transmission T. The transmission T is suspended from the vehicle body frame F.

As shown in FIG. 5, the crankshaft 11 which constitutes a pedal-type crankshaft is provided in a state wherein the crankshaft 11 penetrates the left and right crank bearing holes 25L, 25R of the casing 20 and has left and right end portions thereof projecting outside the casing 20. A pair of crank arms 12 have proximal ends thereof fitted on the projecting left and right end portions of the crankshaft 11. As shown in the drawings, pedals 39 are rotatably mounted on distal ends of the crank arms 12.

As shown in FIG. 1 and FIG. 5, the bolt-like pivot shaft 7 extends by penetrating a through hole 2c of a pivot boss 2b which is formed on a rear portion 2a of the main frame 2 and bushings 13 which are fitted in pivot bearing holes 26L, 26R formed in the left and right reinforcing members 22L, 22R of the casing 20, and is fixed to a rear portion of the main frame 2 by a nut 34 which is threadedly engaged with a distal end of the bolt-like pivot shaft 7. The respective swing arms 8 are tiltably supported on the pivot shaft 7 on the left and right outsides of the casing 20 and between the casing 20 and the rear portions of the respective main frames 2 by way of a collar 18 and a bearing 19.

Figure 4:
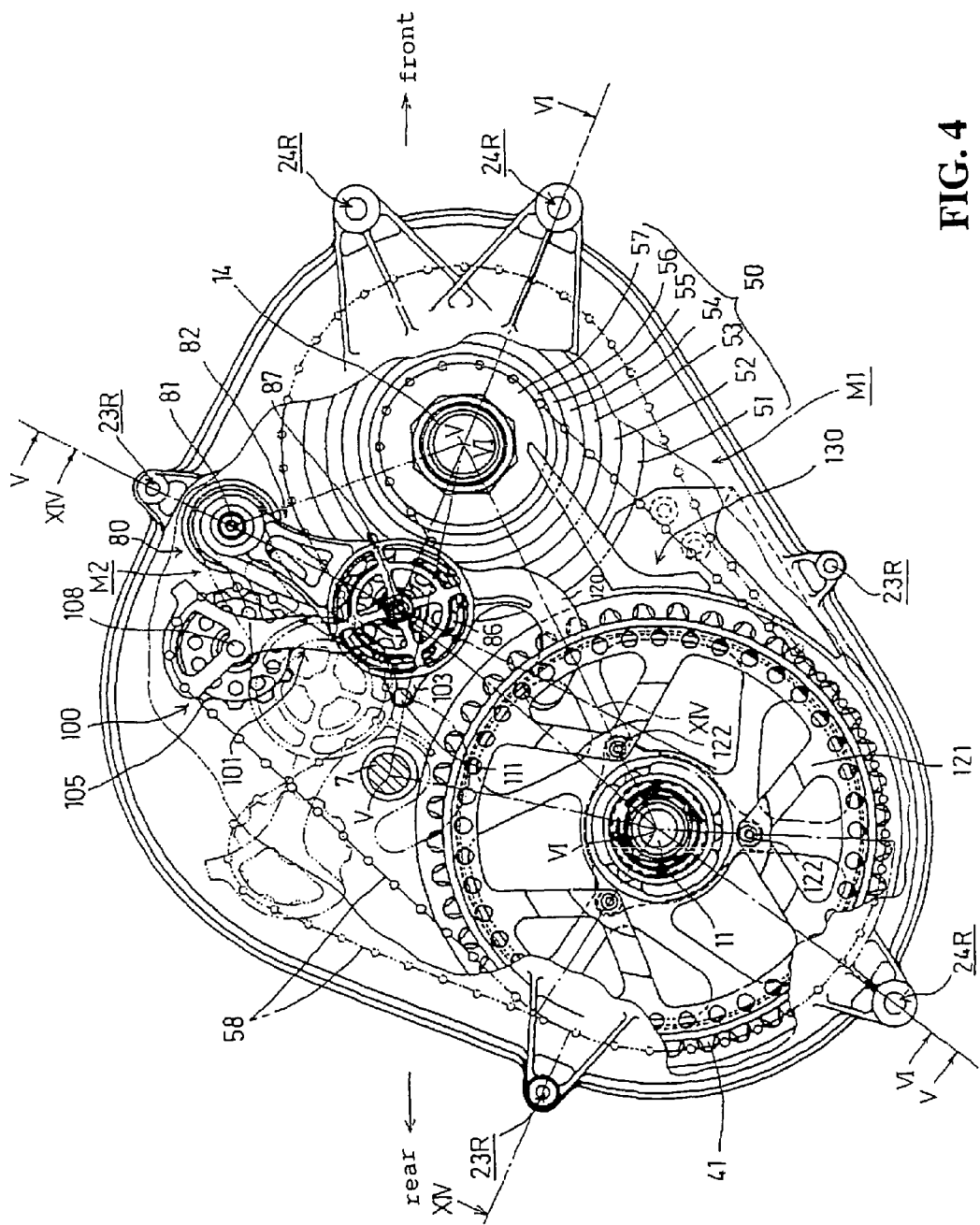
FIG. 4 is a right side view which allows the observation of the inside of a transmission T by removing a part of a right cover of the transmission T.
Figure 6:
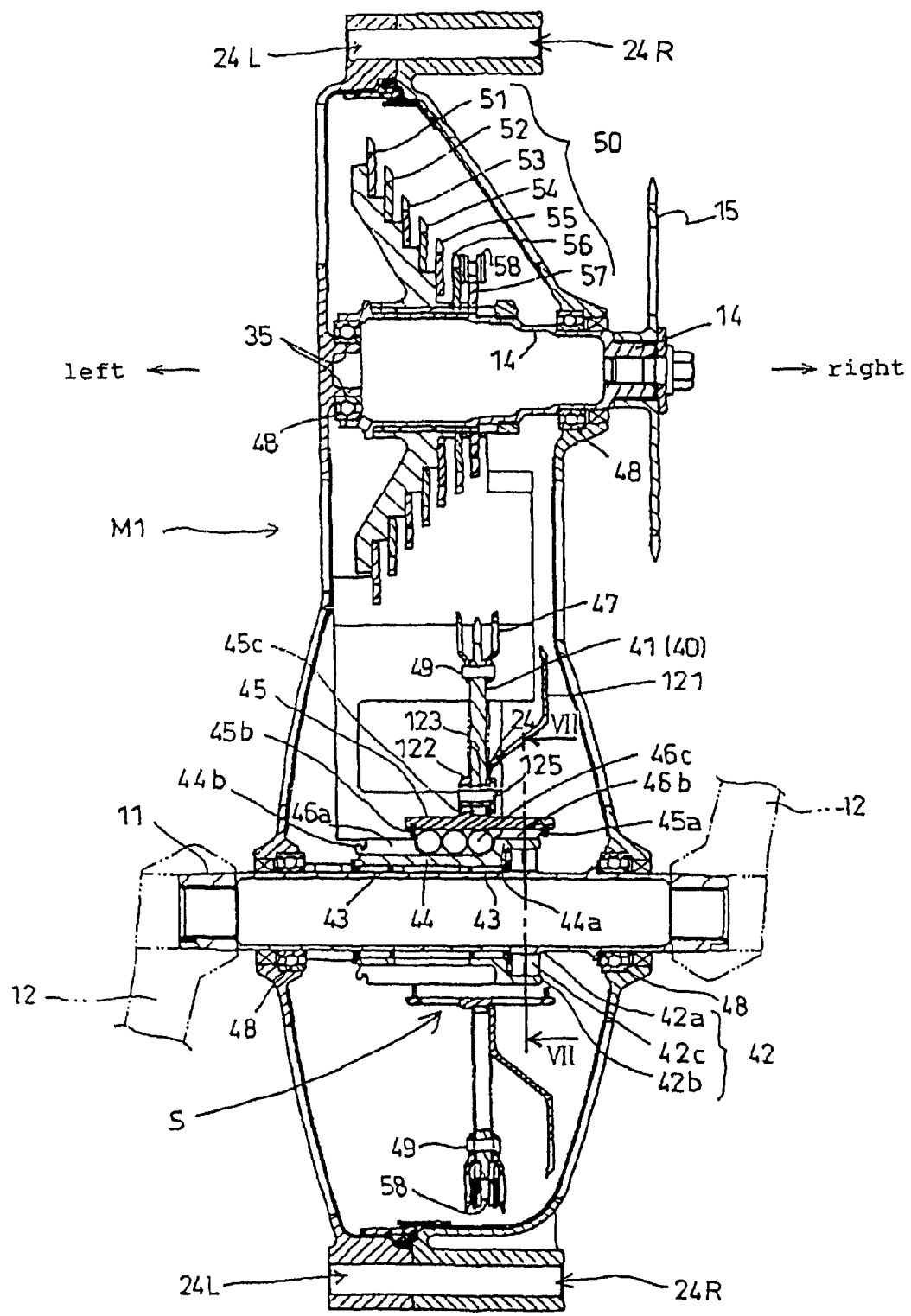
FIG. 6 is a cross-sectional view taken along a line VI-VI in FIG. 4.

FIG. 4 is a right side view of the inside of the transmission T with a portion of the right casing 20R taken away. FIG. 6 is a cross-sectional developed view taken along a line VI-VI in FIG. 4 which illustrates a portion which is relevant to the crankshaft 11 and the output shaft 14.

On a right end portion of the output shaft 14 which is accommodated in the inside of the casing 20 and projecting outwardly from an output bearing hole 29 of the right casing 20R, the rear-wheel drive sprocket wheel 15 is fitted on.

As shown in FIG. 1, a rear wheel drive chain 17 extends between and is wound around the rear-wheel drive sprocket wheel 15 and the rear-wheel driven sprocket wheel 16 which is formed on the rear wheel Wr.

The rear-wheel drive sprocket wheel 15, the rear-wheel driven sprocket wheel 16 and the rear wheel drive chain 17 constitute the drive force transmission mechanism which drives the rear wheel Wr which is a drive wheel of the vehicle.

The output shaft 14 is always operated in an interlocking manner with the rear wheel Wr and is rotated in the forward direction P and the backward direction Q in an interlocking manner with the rear wheel Wr.

FIG. 8 is a cross-sectional developed view taken along a line VIII-VIII in FIG. 3 which illustrates portions relevant to the guide pulley support shaft 87 and the derailleur shaft 81.

In FIGS. 4, 5, 6 and 8, the transmission T includes a transmission mechanism M1 and a transmission changeover mechanism M2 which are accommodated in the inside of the casing 20.

The transmission mechanism M1 mainly includes portions which are relevant to the crankshaft 11 and the output shaft 14 shown in FIG. 5 and FIG. 6, while the transmission changeover mechanism M2 mainly includes portions which are relevant to the derailleur shaft 81 shown in an upper portion of FIG. 8.

The transmission changeover mechanism M2 acts on the transmission mechanism M1 to perform the shifting to move the transmission mechanism M1 to a desired transmission position.

Figure 7:
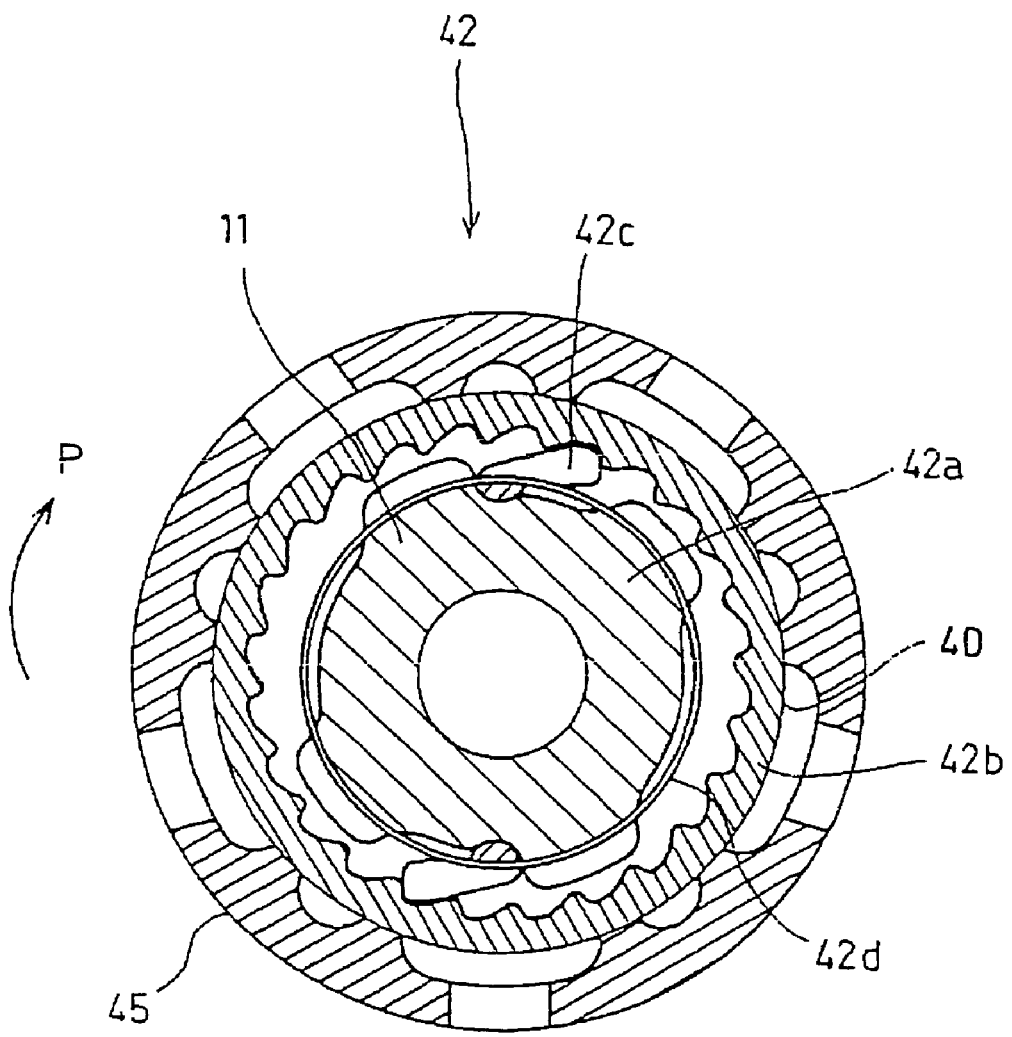
FIG. 7 is a cross-sectional view taken along a line VII-VII in FIG. 6.

The transmission mechanism M1 includes the one-way clutch 42 shown in FIG. 7, a slide mechanism S, a drive sprocket wheel body 40, a transmission sprocket wheel body 50, an endless transmission chain 58 and the output shaft 14 shown in FIG. 6.

The transmission sprocket wheel body 50 includes a plurality of sprocket wheels 51 to 57 connected to the output shaft 14 in an overlapped manner in multiple stages with a gap therebetween in an ascending order from the left side to the right side.

As shown in FIG. 5, the crankshaft 11 is rotatably supported on the casing 20 by way of the pair of right and left bearings 48 which are fitted in the crankshaft holes 25L, 25R of the left and right reinforcing members 22L, 22R of the casing 20. The crank arms 12 are integrally fitted on both ends of the crankshaft 11. As shown in FIG. 1, the pedals 39 are pivotally mounted on the distal ends of the crank arms 12. The utilizing the legs of a rider, not shown in the drawing, who sits on the saddle 6 in a striding manner, the crankshaft 11 is rotatably driven in the advancing direction P.

In FIG. 6, with respect to the crankshaft 11, the drive sprocket wheel body 40 is arranged between both the bearings 48 and the drive sprocket wheel 41 of the drive sprocket wheel body 40 and is mounted on the crankshaft 11 by way of the one-way clutch 42 and the slide mechanism S which are coaxially arranged with the crankshaft 11. The drive sprocket wheel body 40 is rotatably driven by the crankshaft 11.

As shown in FIGS. 6 and 7, the one-way clutch 42 includes a clutch inner race 42a which is constituted of an outer peripheral portion per se which is a portion of the crankshaft 11, a clutch outer race 42b which is constituted of a portion of an inner cylinder 44 described later, a plurality of ratchet pawls 42c which are engaged with engaging portions formed on an inner periphery of the clutch outer race 42b, and a ring spring 42d which is mounted on the clutch inner race 42a and biases the ratchet pawls 42c such that distal ends of the ratchet pawls 42c are engaged with recessed portions formed in an inner peripheral surface of the clutch outer race 42.

Due to an action of the one-way clutch 42, only when the rider steps on the pedals 39 so as to rotate the crankshaft 11 in the advancing direction P which advances the vehicle, the rotational force of the crankshaft 11 is transmitted to the drive sprocket wheel 41. Further, during the advancing of the vehicle, when the rider stops stepping on the pedals 38 and the drive sprocket wheel 41 is rotated in the advancing direction P, that is, the crankshaft 11 is rotated in the retracting direction Q relatively with respect to the drive sprocket wheel 41, the transmission of the rotational force from the drive sprocket wheel 41 to the crankshaft 11 is interrupted.

In FIG. 6, between the one-way clutch 42 and the drive sprocket wheel 41, the slide mechanism S is provided, wherein the slide mechanism S allows the drive sprocket wheel 41 to move in the crankshaft axial direction with respect to the crankshaft 11 and, at the same time, allows the drive sprocket wheel 41 to be rotated integrally with the clutch outer 42b of the one-way clutch 42.

The slide mechanism S includes an inner sleeve 44, an outer sleeve 45 and a ball spline mechanism 46.

The inner sleeve 44 is a sleeve which constitutes the above-mentioned clutch outer 42b with a right end thereof and is rotatably supported on an outer periphery of the crankshaft 11 by way of a pair of needle bearings 43, while the outer sleeve 45 is a sleeve which is arranged radially outside the inner sleeve 44.

The ball spline mechanism 46 is a spline engagement mechanism which uses balls between an outer peripheral surface of the inner sleeve 44 and an inner peripheral surface of the outer sleeve 45. The drive sprocket wheel 41 and a drive sprocket wheel movement restricting member 121 are integrally connected to the outer sleeve 45 by rivets 125 which are caulked after penetrating respective rivet holes 122, 123, 124 formed in the outer sleeve 45, the drive sprocket wheel 41, and the drive sprocket movement restricting member 121. Accordingly, the outer sleeve 45, the drive sprocket wheel 41 and the drive sprocket wheel movement restricting member 121 are integrally moved along the crankshaft 11 and, at the same time, are rotated with respect to the casing 2.

A chain guide 47 is integrally mounted on the outer peripheral portion of the drive sprocket wheel 41 by rivets 49.

As shown in FIGS. 5 and 6, the ball spline mechanism 46 which integrally rotates the slide mechanism S and the drive sprocket wheel 41 and, at the same time, allows the drive sprocket wheel 41 and the outer sleeve 45 to move in the crankshaft axial direction with respect to the inner sleeve 44 includes a plurality of pairs of accommodating grooves 46a, 46b having a semicircular cross section which are formed of an outer peripheral surface of the inner sleeve 44 and the inner peripheral surface of the outer sleeve 45, face each other in an opposed manner in the radial direction and are directed in the crankshaft direction. Rows of balls include a plurality of balls 46c which are accommodated rotatably in respective pairs of accommodating grooves in a striding manner, and engage with the inner sleeve 44 and the outer sleeve 45 in the circumferential direction. To restrict the movable range of the drive sprocket wheel 41 and the outer sleeve 45 and, at the same time, to prevent the removal of the balls 46c, stoppers 44a, 44b, 45a, 45b are provided to both end portions of the inner sleeve 44 and the outer sleeve 45.

Figure 12:
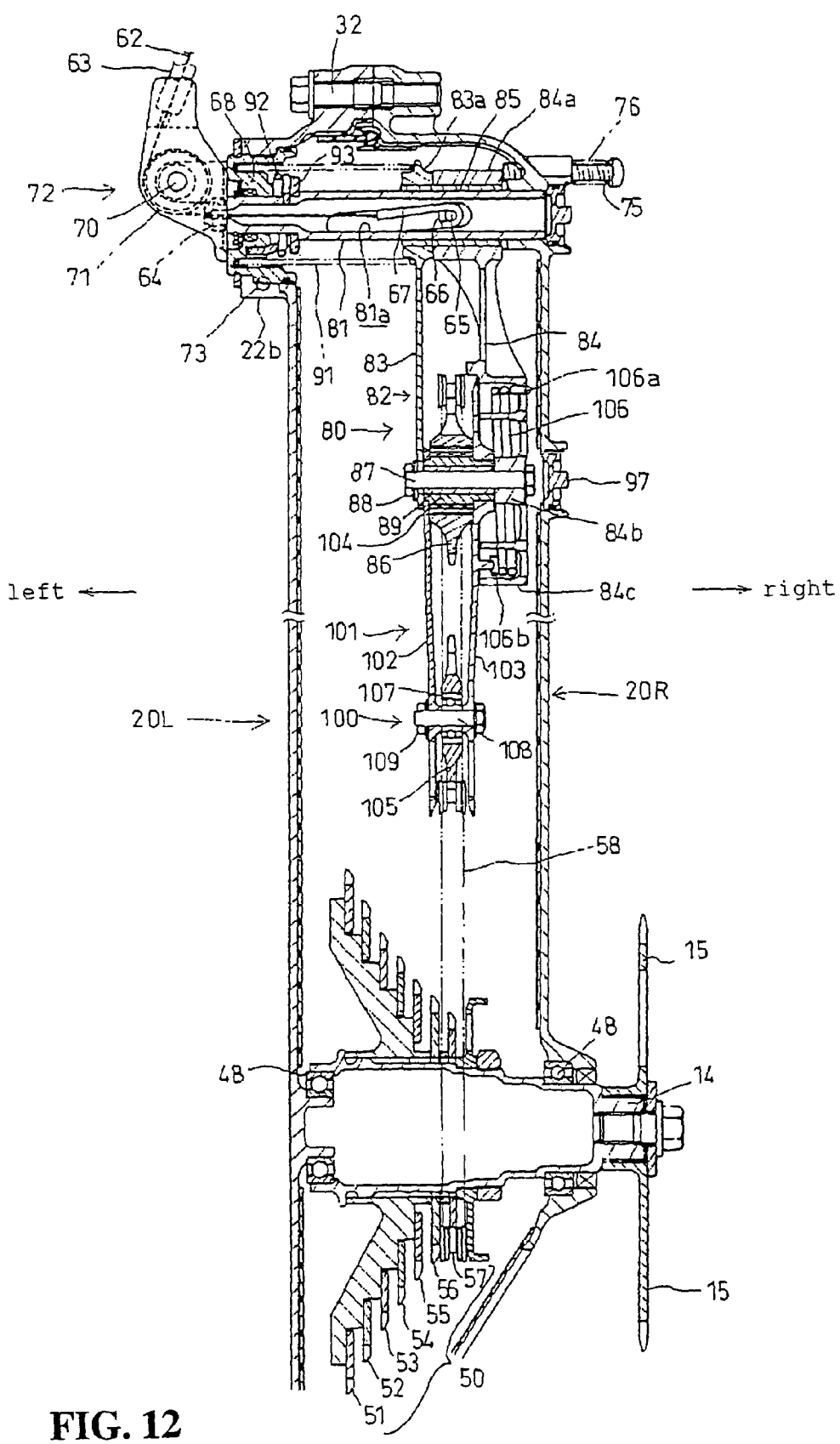
FIG. 12 is a cross-sectional view taken along a line XII-XII in FIG. 3.
Figure 13:
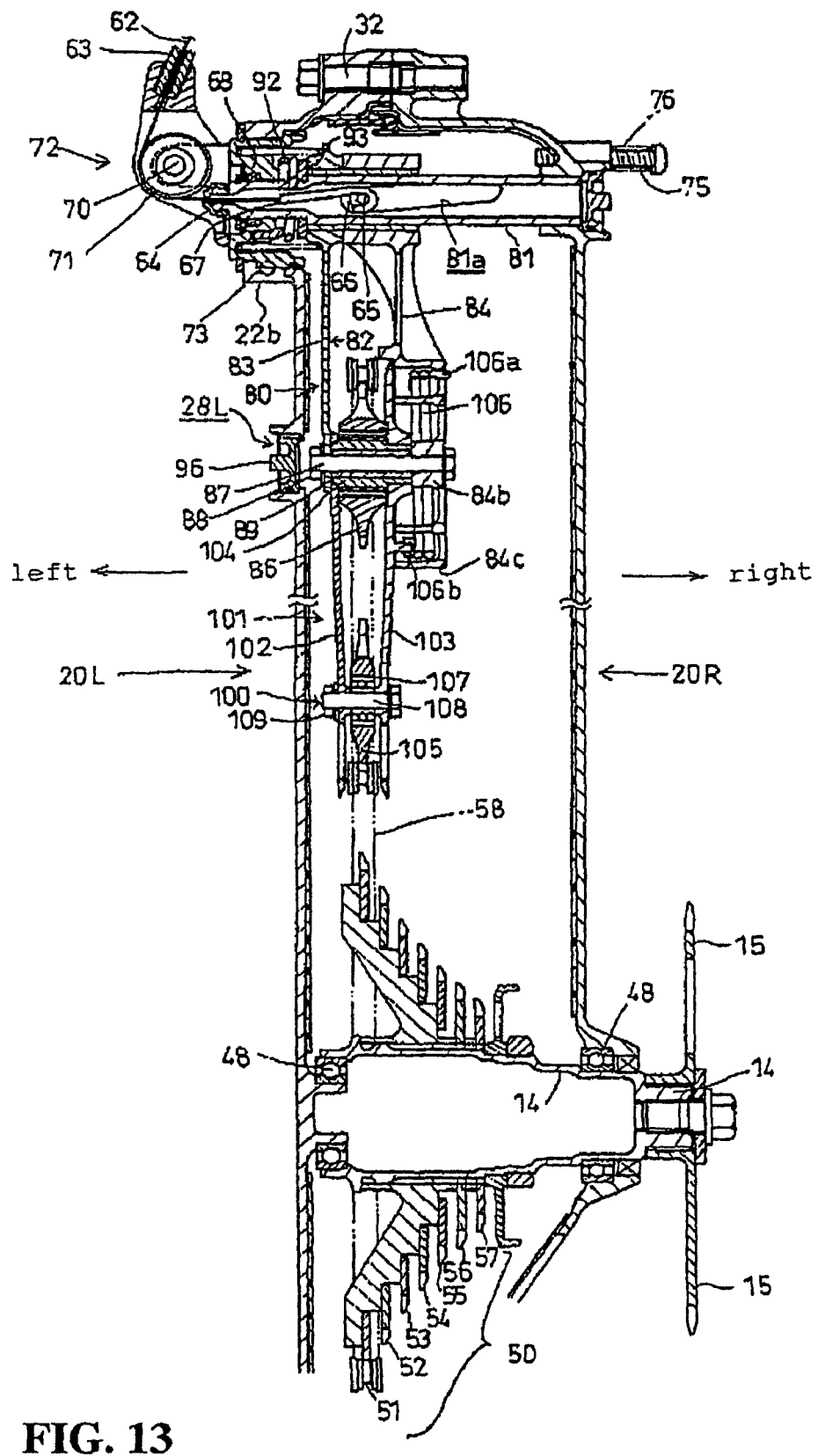
FIG. 13 is a cross-sectional view taken along a line XIII-XIII in FIG. 3 in another state.

As shown in FIGS. 6, 12 and 13, the output shaft 14 is rotatably supported by way of the pair of left and right bearings 48 which are respectively held by the left and right reinforcing members 22L, 22R of the casing 20.

Between the left and right bearings 48 for the output shaft 14, the multi-stage transmission sprocket wheel body 50 for the transmission includes the plurality of transmission sprocket wheels that are mounted on the output shaft 14 such that the transmission sprocket wheel body 50 is constantly integrally rotated with the output shaft 14. In this embodiment, the above-mentioned multi-stage transmission sprocket wheel body 50 is a sprocket wheel body which includes transmission sprocket wheels 51 to 57 for seven types of transmission which differ in outer diameter relative to each other.

Seven transmission sprocket wheels 51 to 57 are arranged in the output shaft axial direction such that the speed is sequentially lowered from the right side to the left side from the transmission sprocket wheel 57 for the seventh speed (maximum speed) having the minimum outer diameter to the transmission sprocket wheel 51 for the first speed (the minimum speed) having the largest outer diameter and, at the same time, the transmission sprocket wheel 51 to 57 are connected to the output shaft 14 in a spline engagement on the outer peripheral surface of the output shaft 14.

The transmission chain 58 extends between and is wounded around the drive sprocket wheel body 40 and the transmission sprocket wheel body 50 so as to transmit the rotation between the crankshaft 11 and the output shaft 14 by means of the transmission chain 58.

The transmission changeover mechanism M2 described later is a mechanism which performs the transmission by changing over the winding of the transmission chain 58 among the group of transmission sprocket wheels 51 to 57. That is, the transmission changeover mechanism M2 functions to extend the transmission chain 58 between one transmission sprocket wheel which is selected out of the transmission sprocket wheels 51 to 57 by the transmission changeover mechanism M2 and the above-mentioned drive sprocket wheel 41.

Accordingly, the output shaft 14 is rotatably driven by the crankshaft 11 with a transmission ratio which is determined by a tooth number ratio between the above-mentioned transmission sprocket wheels 51 to 57 and the drive sprocket wheel 41.

Then, the power of the output shaft 14 is transmitted to the rear wheel Wr by way of the rear wheel drive sprocket wheel 15, the rear wheel drive chain 17 and the rear wheel driven sprocket wheel 16 (see FIG. 1) which are provided on the right side and outside of the casing 20.

FIG. 8 is a cross-sectional view taken along a line VIII-VIII in FIG. 3 and shows portions which are mainly relevant to the derailleur shaft 81 of the transmission mechanism M2. FIG. 12 is a cross-sectional developed view taken along a line XII-XII in FIG. 3 and is a cross-sectional developed view which is formed by adding a cross-sectional view of the output shaft 14 to the above-mentioned cross-sectional view. FIG. 13 shows another state.

In FIGS. 1, 8 and 12, the transmission changeover mechanism M2 which is operated by a transmission manipulating mechanism 60 includes the derailleur 80 which has the guide pulley 86, and a tensioner 100 which has a tensioner pulley 105.

Further, as shown in FIG. 4, the transmission chain 58 is wound around the drive sprocket wheel 41 and the above-mentioned transmission sprocket wheels 51 to 57. Further, during operation, the transmission chain 58 is wound around the guide pulley 86 and the tensioner pulley 105 which are arranged at a side where the transmission chain 58 is slackened.

The transmission manipulating mechanism 60 shown in FIG. 1 includes a transmission manipulating member 61 which includes a transmission lever or the like which is manipulated by the rider, a wire 62 which connects the transmission manipulating member 61 and the derailleur 80 to transmit an operation of the transmission manipulating member 61 to the derailleur 80, and an outer tube 63 which covers the wire 62. See FIG. 1 and FIG. 8.

In FIG. 8, the derailleur 80 includes a derailleur shaft 81 which is rotatably supported on an upper front portion of the casing 20, a derailleur arm 82 which has a proximal end portion thereof slidably fitted on and supported on the derailleur shaft 81 in a state that the proximal end portion is turnable and movable in the axial direction, a guide pulley 86 which is rotatably supported on a distal end portion of the derailleur arm 82, a compression coil spring 91 which pushes the derailleur arm 82 along the derailleur shaft 81 in the rightward direction, a manipulating pin 65 which constitutes a manipulating element for moving the derailleur arm 82 with respect to the derailleur shaft 81 in response to the transmission manipulation by the transmission manipulating mechanism 60, and a balancing spring 92 which is constituted of a torsional coil spring which biases the derailleur arm 82 in the rotating direction (see FIG. 4) which is directed to the output shaft 14 against a tension of the transmission chain 58 which is applied by the tensioner pulley 105.

As shown in FIGS. 5, 12 and 13, the derailleur shaft 81 is rotatably supported on the casing 20 such that a center line thereof becomes parallel to a rotation center line of the transmission sprocket wheel body 50, while the guide pulley 86 is supported on the derailleur arm 82 such that a rotation center line thereof becomes parallel to the rotation center line of the transmission sprocket wheel body 50.

More particularly as shown in FIG. 8, a left end portion of the derailleur shaft 81 is rotatably supported on the left reinforcing member 22L by way of the bearing cap 68 which is fitted in the derailleur bearing hole 27L of the left reinforcing member 22L, while a right end portion of the derailleur shaft 81 is rotatably supported on the right reinforcing member 22R in a state wherein the right end portion is fitted in the derailleur bearing hole 27R of the right reinforcing member 22R.

Here, an opening of the derailleur bearing hole 27R of the right reinforcing member 22R is closed by inserting the cap 69 therein from the outside.

The bearing cap 68 is positioned and mounted such that the bearing cap 68 is inserted in the derailleur bearing hole 27L of the left reinforcing member 22L from the inside, the flange portion 68a is fitted in an inner shoulder portion of the derailleur bearing hole 27L, and a retainer ring 98 is fitted in an annular groove formed in an outer peripheral surface of the left end of the bearing cap 68. The derailleur shaft 81 which penetrates the bearing cap 68 and is rotatably supported by the bearing cap 68 has its movement thereof in the right direction restricted such that a retainer ring 95 which is fitted in an annular groove formed in the outer peripheral surface is brought into contact with a washer 94 which is fitted on an outer peripheral surface of a projecting end portion of the derailleur shaft 81. The leftward movement in the axial direction of the derailleur shaft 81 is restricted by a washer 93 which is fitted on a shoulder portion formed on an outer peripheral surface in the inside of the derailleur shaft 81.

Accordingly, although the rotation of the derailleur shaft 81 is allowed, the movement of the derailleur shaft 81 in the axial direction is restricted.

As shown in FIG. 8, the balancing spring 92 which is wound around the outer periphery of the derailleur shaft 81 has a right end 92a which constitutes one end thereof engaged with a portion of the derailleur shaft 81 at a position along the washer 93 and a left end 92b which constitutes another end engaged with the bearing cap 68.

That is, between the bearing cap 68 and the derailleur shaft 81, the balancing spring 92 which is constituted of a torsional coil spring is interposed in the relative rotational direction.

Figure 9:
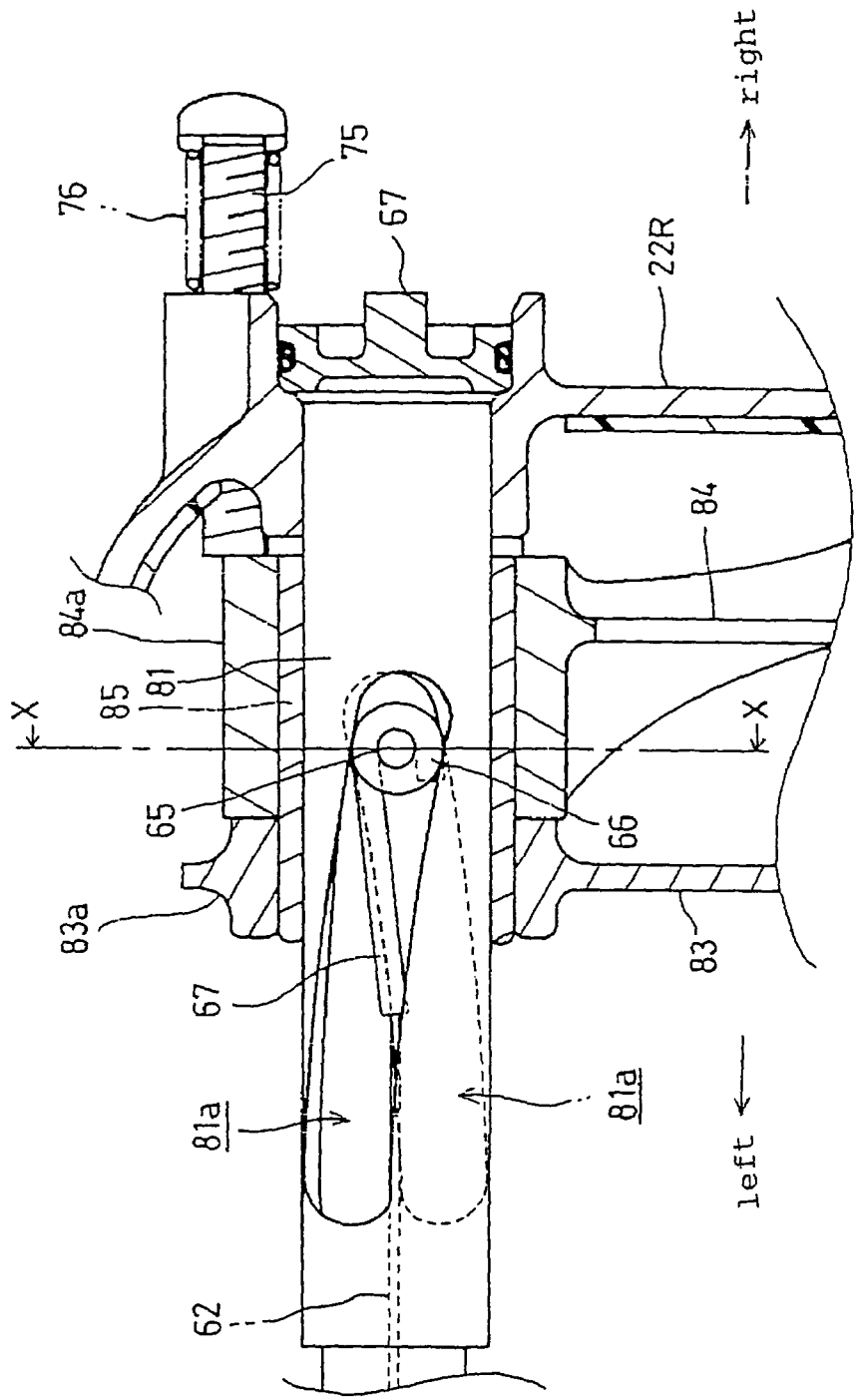
FIG. 9 is an enlarged partial cross-sectional view of an essential part of a derailleur.
Figure 10:
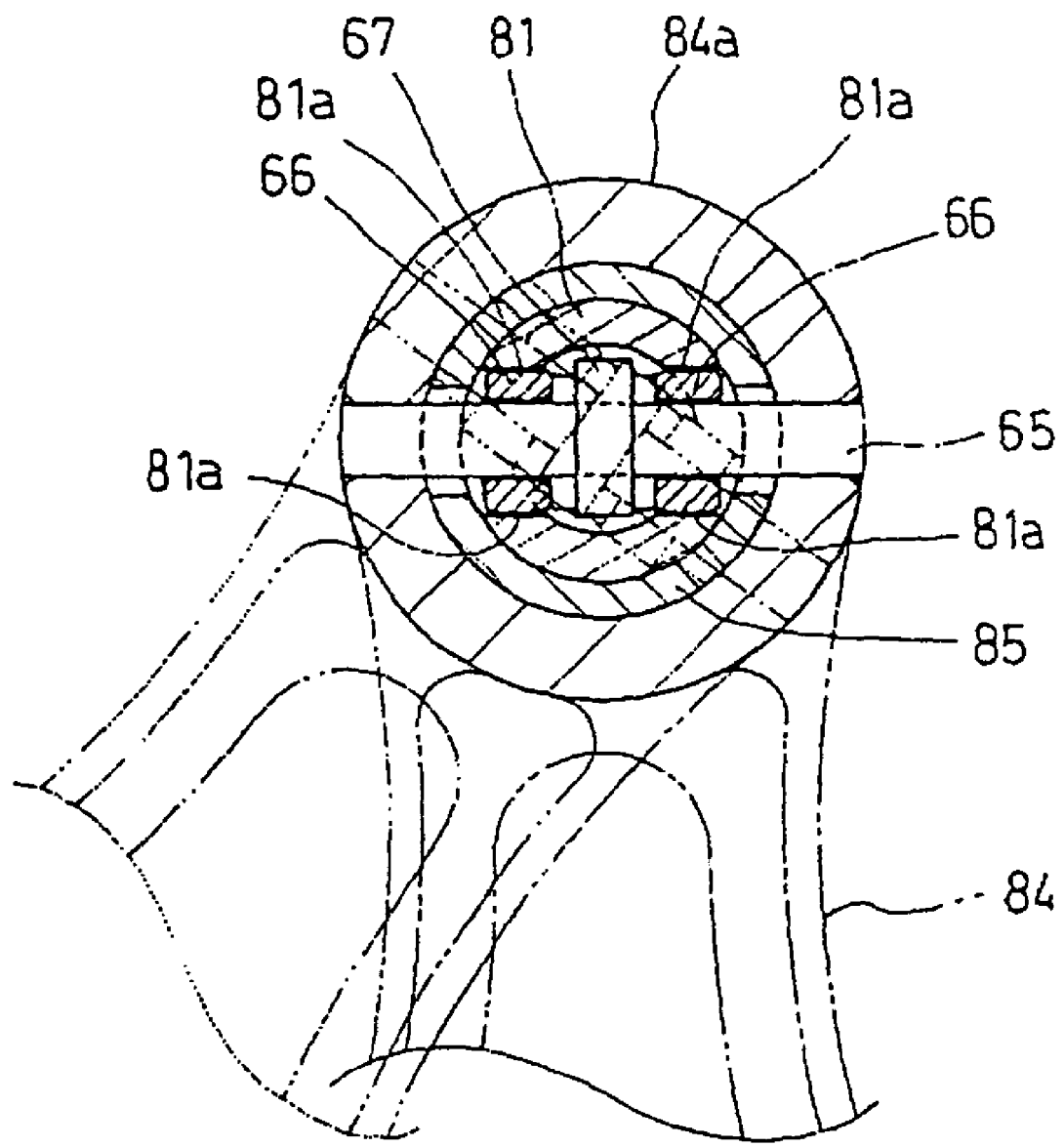
FIG. 10 is a cross-sectional view taken along a line X-X in FIG. 9.

As shown in FIGS. 8 and 9, a pair of twisted guide holes 81a, 81a which are gently spirally inclined in the axial direction are formed in a sleeve wall of the cylindrical derailleur shaft 81 in a center axis symmetry. As shown in FIG. 10, a pair of rollers 66, 66 which are arranged on the manipulating pins 65 which penetrate both guide grooves 81a, 81a are respectively fitted in the guide holes 81a, 81a in a rotatable manner.

As shown in FIGS. 9 and 10, a ring-like roller 66 having an outer diameter of 6 mm and an inner diameter of 3 mm is rotatably pivoted on the manipulating pin 65 having a diameter of 3 mm. The roller 66 is fitted in a guide hole 81a having a width of 6 mm or more such that the roller 66 is rotatable in the inside of the guide hole 81a.

Although a twisting angle of the guide hole 81a, an inclination angle with respect to a mother line which is parallel to the center axis line of the derailleur shaft 81, is approximately 40 degree, when the manipulating pin 65 moves in the inside of the guide hole 81a, the manipulating pin 65 and the roller 66 function to rotate the derailleur shaft 81 and the rotating force twists the balancing spring 92 by approximately 10 degree so that the manipulating pin 65 which is indirectly fitted in the guide hole 81a by way of the roller 66 is turnable together with the derailleur arm 82 within a range of 30°.

As shown in FIG. 10, the manipulating pin 65 extends further outside than both rollers 66, 66 and has both ends thereof fitted on proximal end portions 84a of the second derailleur arm 84 in the derailleur arm 82 which penetrates the derailleur arm 81 and is pivotally supported in a state that the derailleur arm 82 is turnable and movable in the axial direction.

A connecting hook 67 is mounted on a center portion of the manipulating pin 65 which is positioned at an intermediate position between both of these rollers 66, 66 by way of an engagement of a U-shaped end portion.

A wire 62 is inserted into the inside of the derailleur shaft 81 through a small hole formed on a center line of the derailleur shaft 81 at the center of the guide cap 64 which covers a left-end opening of the derailleur shaft 81, and a distal end of the wire 62 is connected to one end of the connecting hook 67.

To perform the assembling steps for connecting the wire 62 to the manipulating pin 65 is, as shown in FIG. 8, the wire 62 is inserted into the inside of the derailleur shaft 81 through the small hole formed in the center of the guide cap 64, the wire 62 is made to pass through the center portion, between the rollers 66, 66, of the manipulating pin 65 and to project from the opening of the derailleur bearing hole 27R, and the connecting hook 67 is connected to the distal end of the wire 62.

Then, the wire 62 is pulled leftward by grasping a portion of the wire 62 which is extended from the guide cap 64 so as to pull the connecting hook 67 connected to the wire 62 into the inside of the derailleur shaft 81, and the U-shaped end portion of the connecting hook 67 is engaged with the center portion of the manipulating pin 65 thus achieving the above-mentioned assembled means.

Here, after assembling, the cap 69 is fitted into the opening of the derailleur bearing hole 27R of the right reinforcing member 22R so as to plug the opening.

Figure 11:
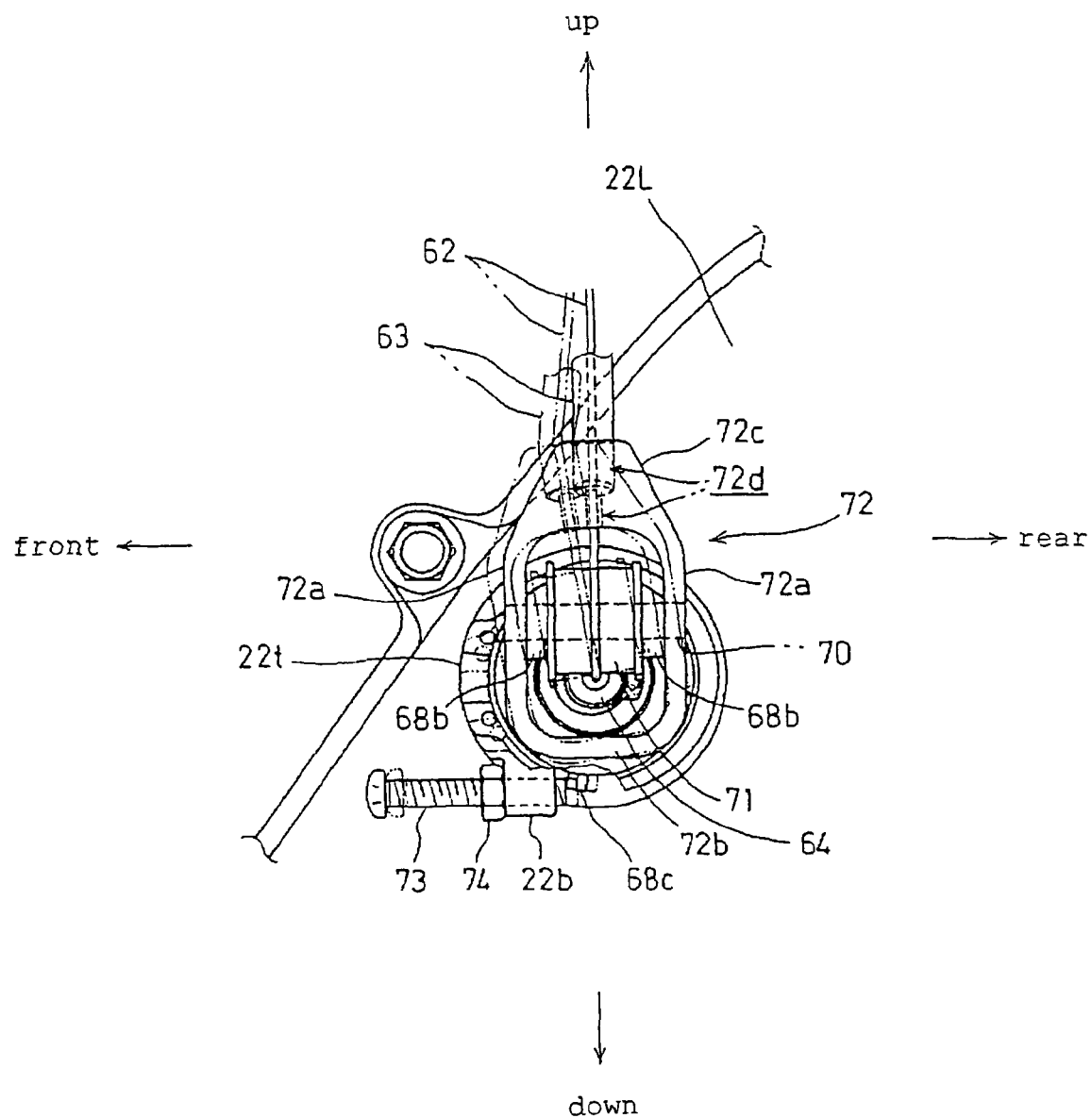
FIG. 11 is an view as viewed in an arrow XI direction in FIG. 8 showing a mounting state of a wire guide member.

As shown in FIGS. 8 and 11, on an outer surface of the bearing cap 68, a pair of support brackets 68b, 68b project in an opposed manner at a position offset to one side. A guide roller 71 is rotatably mounted on the center of a support shaft 70 which has both end portions thereof supported by the support brackets 68b, 68b in a penetrating manner, and the center axis of the derailleur shaft 81 forms a tangent of a circumferential circle of the guide roller 71.

A wire guide member 72 is mounted in a state that the wire guide member 72 covers the periphery of the support brackets 68b, 68b and the guide cap 64.

The wire guide member 72 has the following construction as shown in FIG. 11. Lower ends of side walls 72a, 72a which sandwich the support brackets 68b, 68b from outside are connected by a connecting portion 72b, one end surface of three sides of the side walls 72a, 72b and the connecting portion 72b foes a mating surface with the bearing cap 68. As shown in FIG. 8, upper portions of the side walls 72a, 72a extend upwardly while being separated from the mating surface and are connected thus forming a wire guide portion 72c. A guide hole 72d is formed in the wire guide portion 72c in the oblique upward direction.

An end portion of the large-diameter outer tube 63 is fitted into an upper half portion of the guide hole 72d, while the wire 62 penetrates a lower half portion of the guide hole 72d having a small diameter. See FIG. 8.

The wire guide member 72 has axial holes at positions of the side walls 72a, 72a which become coaxial with the pivotal mounting portions of the above-mentioned support brackets 68b, 68b. The support brackets 68b, 68b are inserted between both side walls 72a, 72a and mating surfaces are made to conform to an outer surface of the bearing cap 68. The guide roller 71 is inserted into the support brackets 68b, 68b, with the support shaft 70 penetrating all of the side wall 72a, the support bracket 68b and the guide roller 71 from the outside so as to mount the wire guide member 72 on the bearing cap 68 and, at the same time, to pivotally support the guide roller 71.

As shown in FIG. 8, the derailleur arm 82 includes a first derailleur arm 83 and a second derailleur arm 84. A cylindrical slide member 85 is slidably fitted on an outer periphery of the derailleur shaft 81 in a state wherein the slide member 85 performs the translation in the center axial direction and the turning. Proximal end portions 83a, 84a of the first and second derailleur arms 83, 84 are fitted on an outer periphery of the slide member 85 under pressure in parallel. A distal end portion 83b of the first derailleur arm 83 and a boss portion 84b formed on the center of a flattened cylindrical portion 84c formed on a distal end of the second derailleur arm 84 are fastened and are integrally connected with each other due to the threaded engagement of a guide pulley support shaft 87 which constitutes a bolt while sandwiching a cylindrical collar 89 therebetween and a nut 88.

Figure 15:
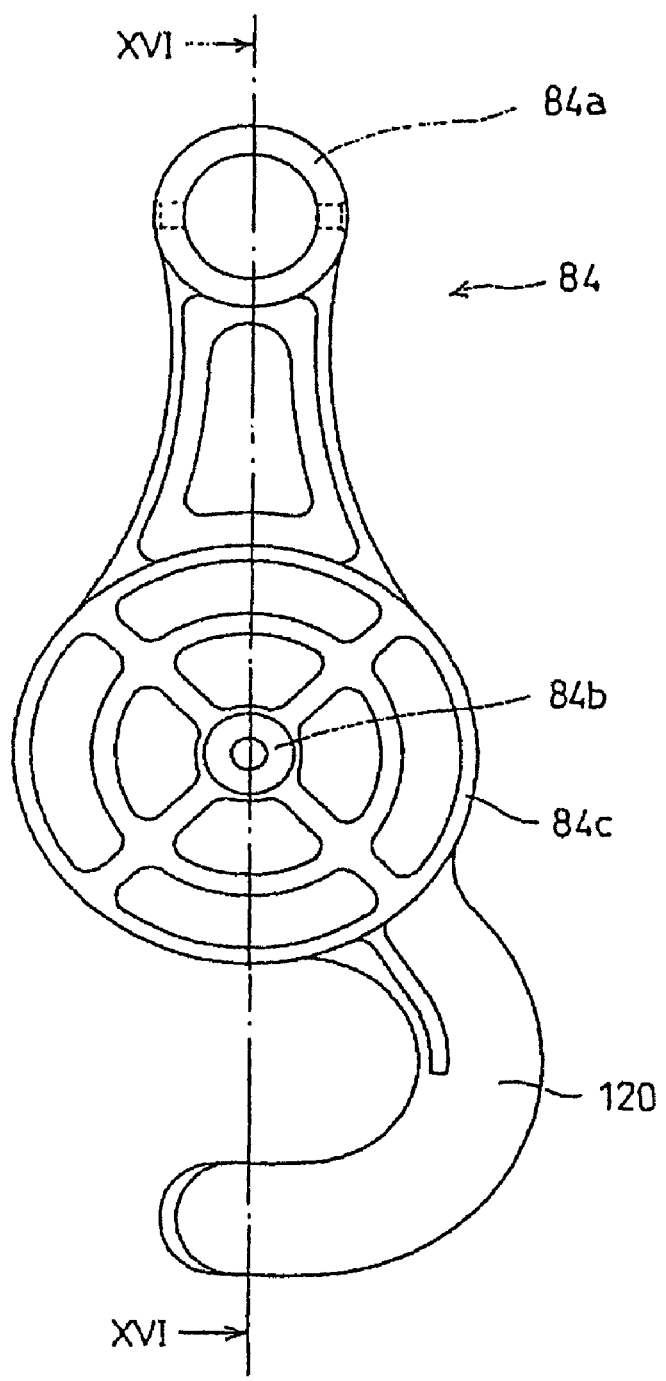
FIG. 15 is a right side view of the above-mentioned second derailleur arm 84.
Figure 16:
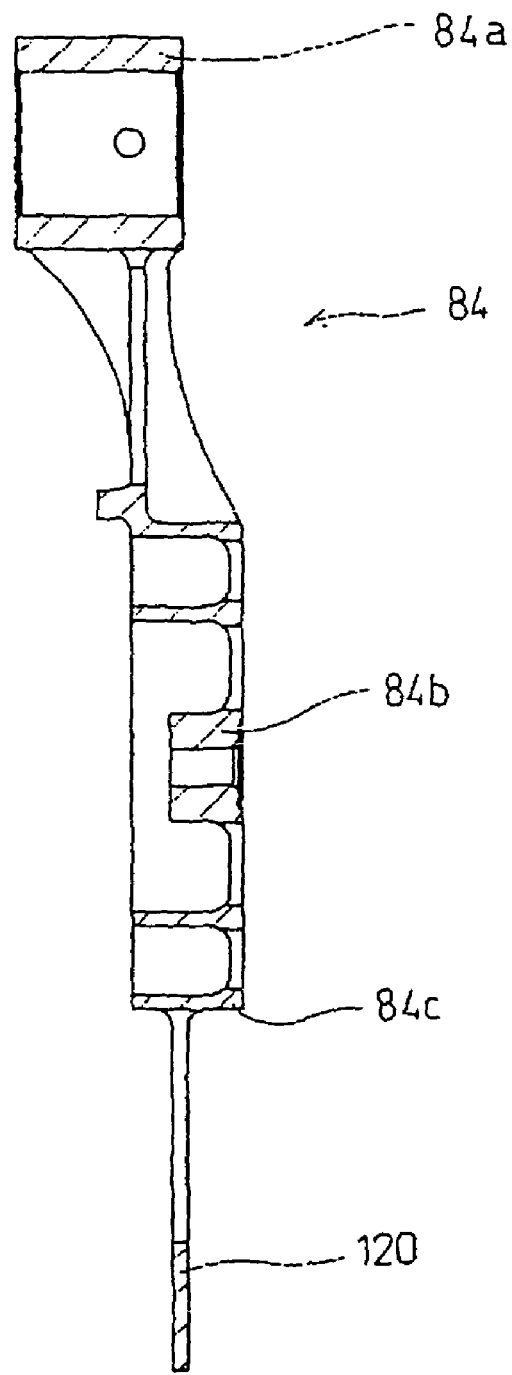
FIG. 16 is a cross-sectional view taken along a line XVI-XVI in FIG. 15.

As shown in FIGS. 8, 15 and 16, a drive sprocket wheel movement restricting member 120 which is curved in an approximately semicircular shape is formed on an outer peripheral portion of the flattened cylindrical portion 84c of the second derailleur arm 84 in a state wherein the drive sprocket wheel movement restricting member 120 extends towards the distal end of the second derailleur arm 84. The drive sprocket wheel movement restricting member 120 is integrally rotated with the derailleur arm 84 around the derailleur shaft 81 at selected positions between a position which is closest to the output shaft 14, indicated by a solid line, and a position which is remotest from the output shaft 14, indicated by a chain double-dashed line, as shown in FIG. 4.

Further, as indicated by a chain double-dashed line in FIG. 4, when the drive sprocket wheel movement restricting member 120 is in a state wherein the drive sprocket wheel movement restricting member 120 assumes the remotest position from the output 14, the drive sprocket wheel movement restricting member 120 is formed into a shape that the inner center of an approximately semicircular arch of the drive sprocket wheel movement restricting member 120 is positioned at the pivot shaft 7 which penetrates the left and right casings 20L, 20R in the inside of the casing 20, that is, a shape in which a radius of curvature of the approximately semicircular arch has a substantially equal value as a radius of the guide pulley 86 of the derailleur 80.

As shown in FIG. 12 and FIG. 13, a cylindrical proximal portion 104 of a tensioner arm 101 of a tensioner 100 is rotatably supported on an outer periphery of the collar 89 through which the guide pulley support shaft 87 penetrates, and a pair of first and second tensioner arms 102, 103 extend from both end portions of the cylindrical proximal portion 104.

As shown in FIG. 8, the guide pulley 86 is rotatably supported on an outer periphery of the cylindrical proximal portion 104 by way of needle bearings 90.

As shown in FIG. 10, the manipulating pin 65 which penetrates a pair of guide holes 81a, 81a of the derailleur shaft 81 further extends to the outside from both rollers 66, 66, and then penetrates the slide member 85, and has both ends thereof fitted on the proximal end portion 84a of the second derailleur arm 84.

Further, the above-mentioned compression coil 91 is interposed between the bearing cap 68 and the proximal end portion 83a of the first derailleur arm 83 and biases the first and second derailleur arms 83, 84 in the right direction.

As shown in FIG. 12 and FIG. 13, the tensioner 100 includes the tensioner arm 101 which has the cylindrical proximal portion 104 thereof pivotally supported on the guide pulley support shaft 87, a tensioner pulley 105 which is pivotally supported on a distal end of the tensioner arm 101, and a tensioner spring 106 which tilts and biases the tensioner arm 101 with respect to the derailleur arm 82.

The tensioner arm 101 includes first and second tensioner arms 102, 103 and a tensioner pulley support shaft 108 which constitutes a bolt penetrates the first and second tensioner arms 102, 103 while sandwiching an inner race of a bearing 107 between distal end portions of the first and second tensioner arms 102, 103 and is threadedly engaged with a nut 109 so as to fasten the first and second tensioner arms 102, 103. Further, the tensioner pulley 105 is fitted on an outer race of the bearing 107 so as to rotatably and pivotally support the tensioner pulley 105 about the tensioner pulley support shaft 108.

Here, to explain in conjunction with FIGS. 4 and 8, projecting portions 102a, 103a are formed in the vicinity of the proximal portions of the first and second tensioner arms 102, 103 with a collar 110 interposed between both projecting portions 102a, 103a. The projecting portions 102a, 103a are integrally connected with each other due to the threaded engagement of a bolt 111 and a nut 112.

As shown in FIGS. 4 and 5, the transmission chain 58 is wound around the drive sprocket wheel 41 which is pivotally mounted on the crankshaft 11 in the clockwise direction in FIG. 4 by way of the one-way clutch 42 and the slide mechanism S. Thereafter, the transmission chain 58 is wound around the tensioner pulley 105 in the clockwise direction. The transmission chain 58 passes between the bolt 111 and the guide pulley 86 and is wound around the guide pulley 86 in the counter clockwise direction. Thereafter, the transmission chain 58 is wound in the clockwise direction around any one of the transmission sprocket wheels 51 to 57 and, thereafter, returns to the drive sprocket wheel 41 and is wound around the drive sprocket wheel 41.

A tensioner spring 106 includes a torsional coil spring, as shown in FIG. 12, and is accommodated in a flattened cylindrical portion 84c formed on a distal end portion of the second derailleur arm 84 in a state wherein the tensioner spring 106 surrounds a center boss portion 84b. One end portion 106a of the tensioner spring 106 is engaged with the second derailleur arm 84, while another end portion 106b of the tensioner spring 106 is engaged with the second tensioner arm 103. Due to a spring force of the tensioner spring 106, the tensioner arm 101 is biased in the clockwise direction about the guide pulley support shaft 87 which includes a pivoting center shaft in FIG. 4 so as to push the tensioner pulley 105. Thus a proper amount of tension is imparted to the transmission chain 58 thus preventing the slackening of the transmission chain 58.

Due to a reaction force of the spring force of the tensioner spring 106, in FIG. 4, a torque in the counter clockwise direction which brings the derailleur arm 82 provided with the guide pulley 86 close to the output shaft 14 is generated.

A balancing spring 92 is interposed between the bearing cap 68 and the derailleur shaft 81 and is formed of a torsional coil spring which is provided for imparting a torque to the derailleur arm 82 by way of the engagement of the guide holes 81a, 81a of the derailleur shaft 81 and the manipulating pin 65. More specifically, as illustrated in FIG. 4, the balancing spring 92 serves to apply a balancing torque which is balanced with the counter clockwise torque which is generated by the reaction force of the spring force of the above-mentioned tensioner spring 106. In this embodiment, a balancing torque in the clockwise direction separates the derailleur arm 82 provided with the guide pulley 86 from the output shaft 14 to the derailleur shaft 81.

Due to such a construction, when the derailleur arm 82 and the guide pulley 86 are moved in the axial direction to enable the changeover of the winding of the transmission chain 58 among the transmission sprocket wheels 51 to 57 which differ in the outer diameter in response to the transmission manipulation of the transmission manipulating mechanism M2, it is possible to hold a tension imparted to the transmission chain 58 to an optimum value in a following manner. Along with the axial movement of the derailleur arm 82, when the transmission chain 58 turns around the derailleur shaft 81, the spring force of the tensioner spring 106 is increased or decreased corresponding to the increase or decrease of the spring force of the balancing spring 92 which is changed along with the tilting of the derailleur arm 82. Thus, the tension applied to the transmission chain 58 can be held at the optimum value.

To explain the operation in conjunction with FIGS. 8 and 11, a lower portion of a cylindrical portion 22t which constitutes the derailleur bearing hole 27L of the left reinforcing member 22L is partially notched to expose a portion of the outer periphery of the bearing cap 68. A screw mounting boss 22b is formed in a bulged manner along a notched opening end surface of the cylindrical portion 22. A projection 68c is formed on an exposed outer peripheral surface of the bearing cap 68 which faces an end surface of the screw mounting boss 22b. An adjusting bolt 73, which is threaded in the direction orthogonal to the derailleur shaft 81, penetrates the screw mounting boss 22b with a distal end of the adjusting bolt 73 being brought into contact with a bulging portion 68c of the bearing cap 68.

Since a torque which acts on the derailleur shaft 81 due to the tension of the transmission chain 58 acts on the bearing cap 68 by way of the balancing spring 92, the projection 68c of the bearing cap 68 is constantly brought into pressure contact with a distal end of the adjusting bolt 73.

A nut 74 is threadedly engaged with the adjusting bolt 73, wherein after the rotary angle of the derailleur shaft 81 is adjusted. The nut 74 is threaded with the adjusting bolt 73 and is brought into contact with the screw mounting boss 22b. Thus, the adjusting bolt 73 is fixed.

As shown in FIG. 8, a coil spring 76 is interposed between a head portion of the stopper bolt 75 and an opening end of the stopper bolt hole 30, wherein the stopper bolt 75 is biased rightwardly by a spring force of the coil spring 76 and the stopper bolt 75 is fixed due to the increase of a frictional force between male threads of the stopper bolt 75 and female threads of the right reinforcing member 22R.

In conjunction with FIGS. 4, 12 and 13, the following explanation is made with respect to a changeover movable range of the guide pulley 86 and a moving path of the guide pulley 86 within the changeover movable range which enable the changeover of winding of the transmission chain 58 which is guided by the guide pulley 86 to respective transmission sprocket wheels 51 to 57.

The above-mentioned changeover movable range of the guide pulley 86 by the transmission manipulation of the transmission manipulation mechanism 60 is defined by a first position, see FIG. 12, where the derailleur arm 82 is brought into contact with the stopper bolt 75 due to the spring force of the compression coil spring 91 and a second position, see FIG. 13, where the manipulating pin 65 moves the derailleur arm 82 leftwardly so that the derailleur arm 82 is brought into contact with a washer 93 which constitutes a stopper.

With respect to the above-mentioned changeover movable range, the axial directional range of the derailleur shaft 81 is set such that the guide pulley 86 assumes the axial directional positions equal to those of the transmission sprocket wheel 57 having the minimum outer diameter and the transmission sprocket wheel 51 having the maximum outer diameter which are transmission sprocket wheels positioned at both axial end portions of the transmission sprocket wheel body 50. The axial directional range of the derailleur shaft 81 is determined by the position of the stopper bolt 75 at the above-mentioned first position and the axial directional position of the washer 93 at the above-mentioned second position.

On the other hand, a rotation movable range about the derailleur shaft is set such that the guide pulley 86 occupies positions where the guide pulley 86 is radially and outwardly spaced apart by given distances from these transmission sprocket wheels 57, 51 corresponding to the transmission sprocket wheel 57 having the minimum outer diameter and the transmission sprocket wheel 51 having the maximum outer diameter. See FIG. 4.

The derailleur shaft 81 is supported on the casing 20 in a state wherein the derailleur shaft 81 is rotatable with respect to the casing 20 and the axial directional movement thereof is interrupted. Accordingly, with respect to the rotational range of the derailleur shaft 81, the rotary positions of the derailleur shaft 81 are determined based on the balancing position where a shape of a spiral guide hole 81a which is gently inclined, a torque Ta which acts on the derailleur shaft 81 by way of the manipulating pin 65 due to the spring force of the tensioner spring 106 which acts on the derailleur arm 82, and a balancing torque Tb which is generated by the spring force of the balancing spring 92 and acts on the derailleur shaft 81 balance with each other.

Accordingly, the shape of the spiral guide hole 81a of the derailleur shaft 81 is, in view of the above-mentioned balancing of the torques, preliminarily designed such that the derailleur arm 82 is turned to respective given turning positions corresponding to respective axial positions which correspond to the transmission sprocket wheels 51 to 57.

The irregularities exist with respect to both-end engaging positions of the balancing spring 92 immediately after assembling. Thus, an initial load of the balancing spring 92 does not agree with a given value. Accordingly, the initial adjustment is necessary and an adjustment method thereof is explained hereinafter.

The above-mentioned peeping hole 28L formed in the left casing 20L is provided at a position where the guide pulley support shaft 87 of the guide pulley 86 and the center axis of the peeping hole 28L are coaxially aligned with each other when, as shown in FIG. 13, the derailleur arm 82 is positioned at an axial directional position which corresponds to the first-speed, minimum transmission ratio, with the transmission sprocket wheel 51 having the largest outer diameter and is also accurately positioned at given turning position, see chain double-dashed line in FIG. 3.

Accordingly, provided that the axial directional position and turning position of the derailleur arm 82 are set to the given relationship, when the transmission ratio is set to a minimum value by manipulating the transmission manipulating member 61 of the transmission manipulating mechanism 60, it is assumed that the guide pulley support shaft 87 can be viewed with naked eyes by peeping the peeping hole 28L of the left casing 20L.

As mentioned previously, when the adjusting bolt 73 is rotated and is advanced, the bearing cap 68 and the left end 92b of the balancing spring 92 are turned in one direction or the reverse direction about the derailleur shaft 81, and the balancing spring 92 is reeled in or reeled out so that the initial load of the balancing spring 92 is increased or decreased whereby the torque Tb which acts on the derailleur shaft 81 by way of the balancing spring 92 is changed as mentioned above. The initial rotary angle of the derailleur shaft 81 is adjusted under the balancing of the torque Tb and the torque Ta which acts on the derailleur shaft 81 due to the tension of the transmission chain 58, whereby the derailleur arm 82 is turned by way of the manipulating pin 65 due to the rotation of the derailleur shaft 81.

Accordingly, by setting the transmission ratio to the minimum value by manipulating the transmission manipulating member 61 after assembling, the threaded engagement state of the adjusting bolt 73 is adjusted by peeping the peeping hole 28L of the left casing 20L. See FIG. 2.

When the adjusting bolt 73 is rotatably manipulated, the derailleur arm 82 is turned simultaneously with the guide pulley support shaft 87. Thus, the adjusting bolt 73 is rotatably manipulated such that the guide pulley support shaft 87 can be viewed through the peeping hole 28L by peeping the peeping hole 28L.

A state in which the adjustment is completed is shown in FIG. 13 and is indicated by a chain double-dashed line in FIG. 3.

In this manner, provided that the initial adjustment of the rotational angle of the derailleur shaft 81 is properly performed when the transmission ratio is at a minimum, since the shape of the guide hole 81a of the derailleur shaft 81 is preliminarily designed by taking the balancing of the torque into consideration, the rotational angles of the derailleur shaft 81 at respective other transmission ratios can be automatically set to given angles, respectively. Thus, it is possible to turn the derailleur arm 82 and the guide pulley 86 to respective turning positions corresponding to respective axial positions which correspond to the transmission sprocket wheels 51 to 57.

After completion of the initial adjustment, the cap 96 is fitted in the peeping hole 28L to plug the peeping hole 28L.

As described above, by performing the rotational manipulation of the adjusting bolt 73 such that the guide pulley support shaft 87 can be observed with the naked eyes while peeping at the peeping hole 28L, it is possible to accurately and simply set the axial directional position and the turning direction of the derailleur arm 82 to given positions.

Figure 14:
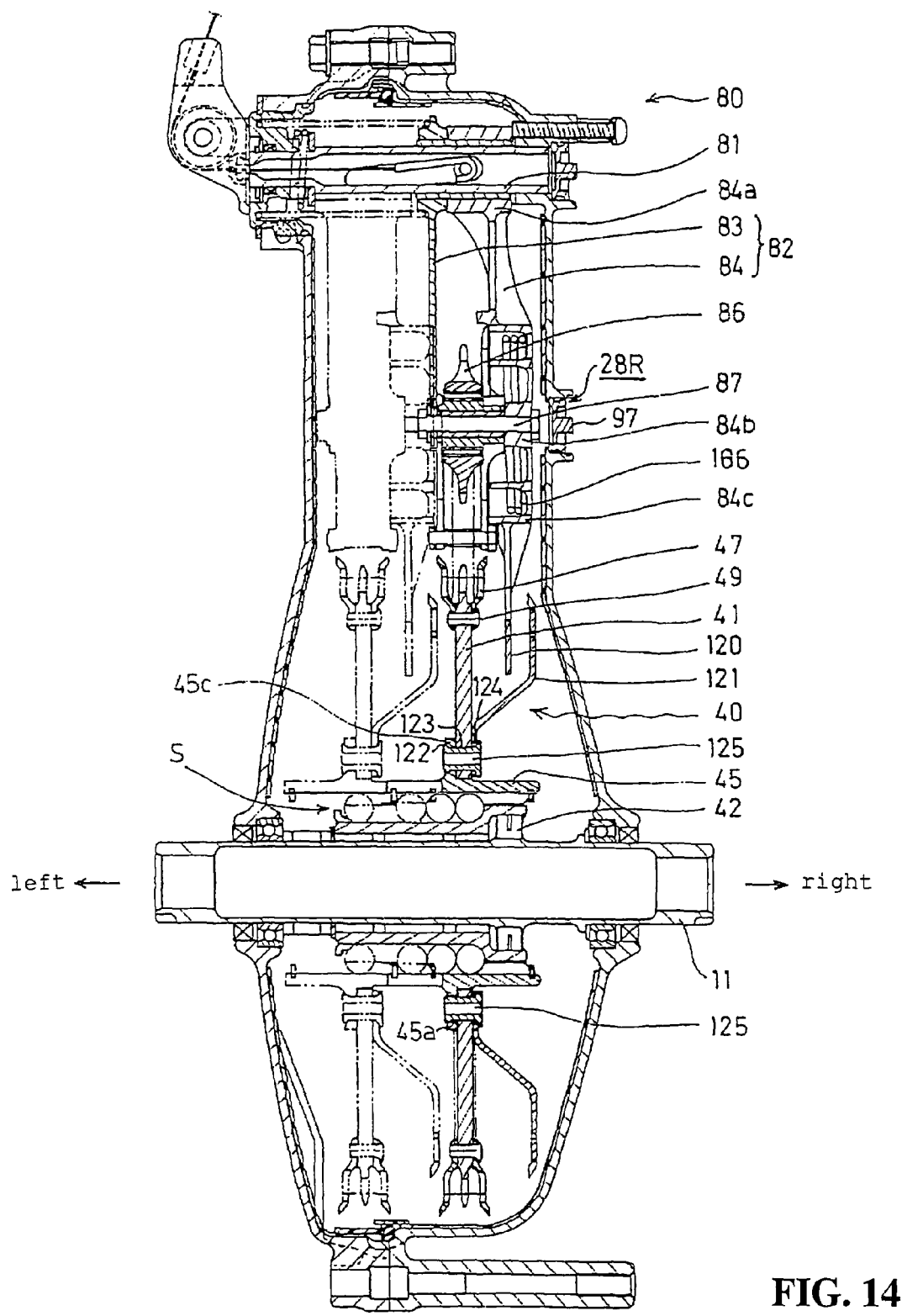
FIG. 14 is a cross-sectional view taken along a line XIV-XIV in FIG. 4.

Next, the slide restricting structure of the drive sprocket wheel body 40 is explained. FIG. 14 is a cross-sectional developed view taken along a line XIV-XIV in FIG. 4. That is, FIG. 14 is a developed view of a cross-section including the crankshaft 11, the guide pulley support shaft 87 and the derailleur shaft 81.

FIG. 15 is a right side view of the above-mentioned second derailleur arm 84 and FIG. 16 is a cross-sectional view taken along a line XVI-XVI in FIG. 15. As shown in FIG. 15, a drive sprocket wheel position setting member 120 is curved in an arcuate shape and extends from an outer peripheral portion of the flattened cylindrical portion 84c. The drive sprocket wheel position setting member 120 is a member which restricts the slide movement of the drive sprocket wheel 41 and is integrally formed with the second derailleur arm 84.

The derailleur arm 82 is rotated together with the drive sprocket wheel position setting member 120 about the derailleur shaft 81 in response to the transmission manipulation and assumes selected positions between a position, indicated by a solid line, where the derailleur arm 82 is arranged closest to the output shaft and a position, indicated by an imaginary line, where the derailleur arm 82 is arranged remotest from the output shaft as viewed from the right side in the axial direction of the output shaft.

In the state wherein the drive sprocket wheel position setting member 120 assumes the position where the member 120 is remotest from the output shaft 14, the pivot shaft 7 assumes a state in which the pivot shaft 7 is positioned at the inner center of an arch of the drive sprocket position setting member 120.

In a lower half portion of FIG. 14, the crankshaft 11 is provided with the drive sprocket wheel body 40 of the transmission mechanism M1, wherein the drive sprocket wheel body 40 includes the one-way clutch 42, the slide mechanism S, the drive sprocket wheel 41, the transmission chain removal preventing chain guides 47, and the drive sprocket movement restricting member 121 which restricts the movement of the drive sprocket wheel. As mentioned previously, the above-mentioned chain guides 47 are mounted on both sides of a tip portion of the drive sprocket wheel 41 using rivets 49.

Figure 17:
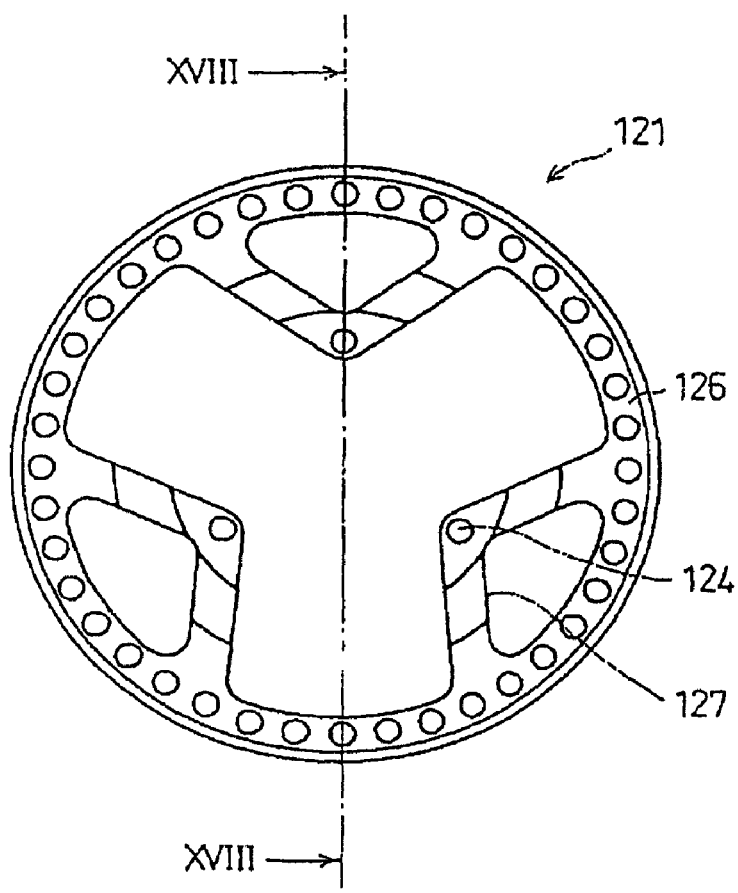
FIG. 17 is a right side view of the above-mentioned drive sprocket wheel movement restricting member 121.
Figure 18:
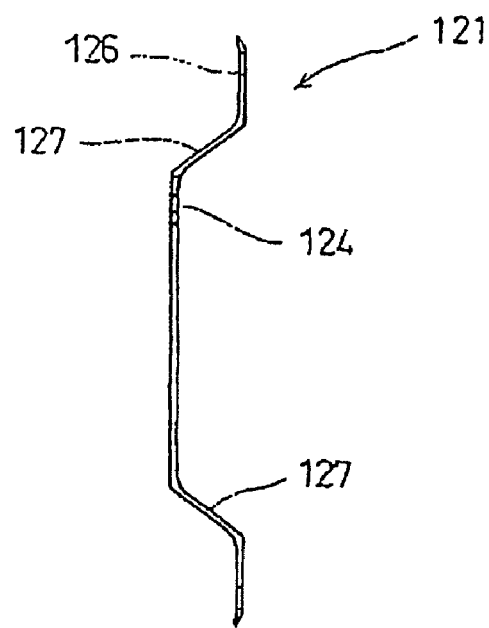
FIG. 18 is a cross-sectional view taken along a line XVIII-XVIII in FIG. 17.

FIG. 17 is a right side view of the above-mentioned drive sprocket wheel movement restricting member 121 and FIG. 18 is a cross-sectional view taken along a line XVIII-XVIII in FIG. 17. Using rivets 125 which penetrate a rivet hole 122 formed in a flange portion 45c of the outer sleeve 45, a rivet hole 123 formed in the drive sprocket wheel 41 and a rivet hole 124 formed in the drive sprocket wheel movement restricting member 121, the drive sprocket wheel movement restricting member 121 is integrally mounted on a right side of the above-mentioned drive sprocket wheel 41 concentrically with the drive sprocket wheel.

As shown in FIG. 4, in a side view, the drive sprocket wheel position setting member 120 is positioned to be overlapped with the drive sprocket wheel movement restricting member 121 between a distal end of a curved portion to an approximately intermediate portion of the arch. The distal end of the drive sprocket wheel position setting member 120 is arranged at an approximately intermediate portion of a line which connects the crankshaft 11 and the guide pulley support shaft 87 of the derailleur 80.

The alignment mechanism of the transmission chain is hereinafter explained. As illustrated in FIG. 4, in a path of the transmission chain extends and is wound around the reel-out side of the transmission sprocket wheel and the reel-in side of the above-mentioned drive sprocket wheel with a chain guide member 130 which aligns the transmission chain being provided.

Figure 19:
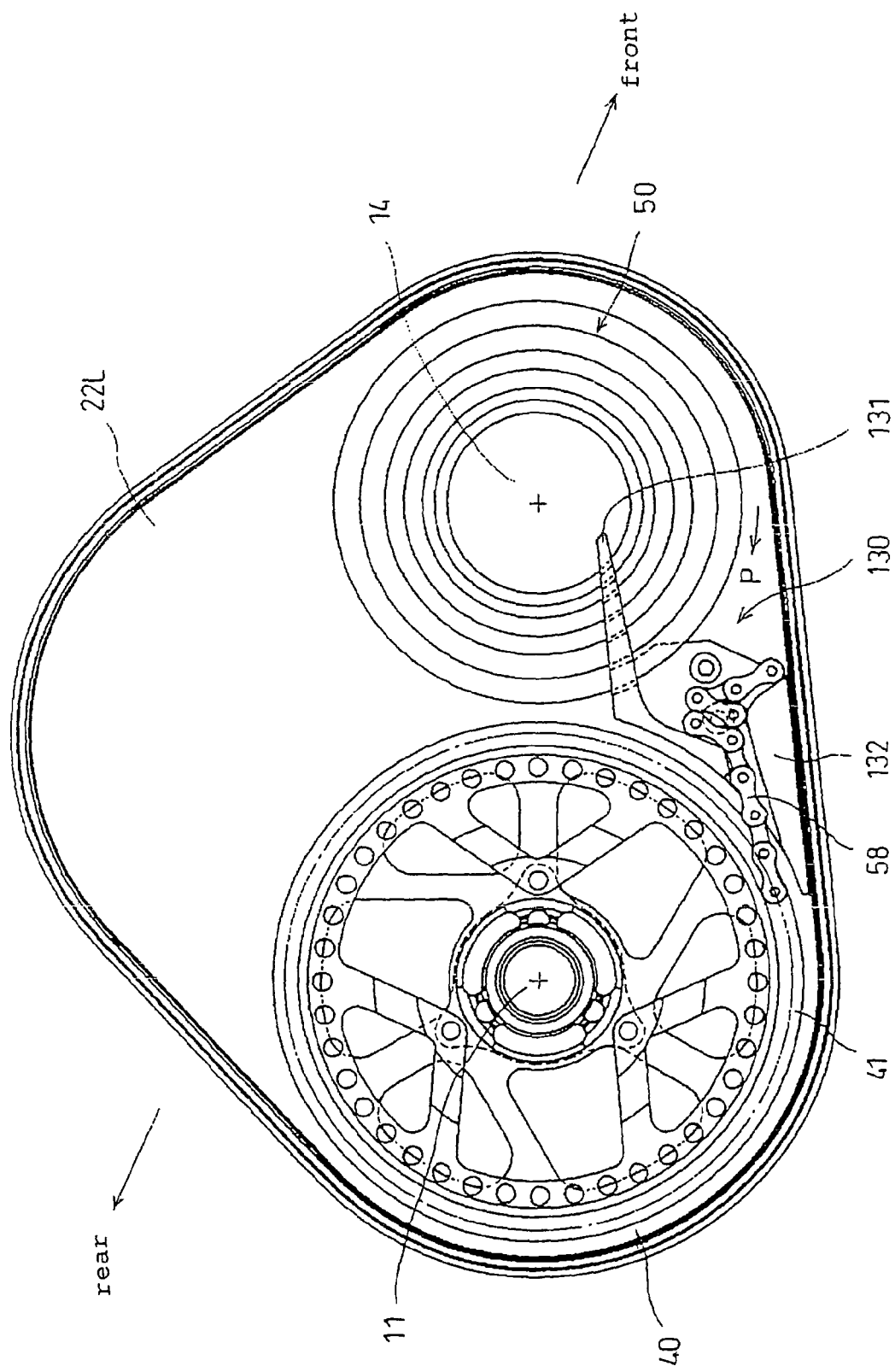
FIG. 19 is a right side view showing only members relevant to the transmission chain alignment in the inside of a transmission casing.
Figure 20:
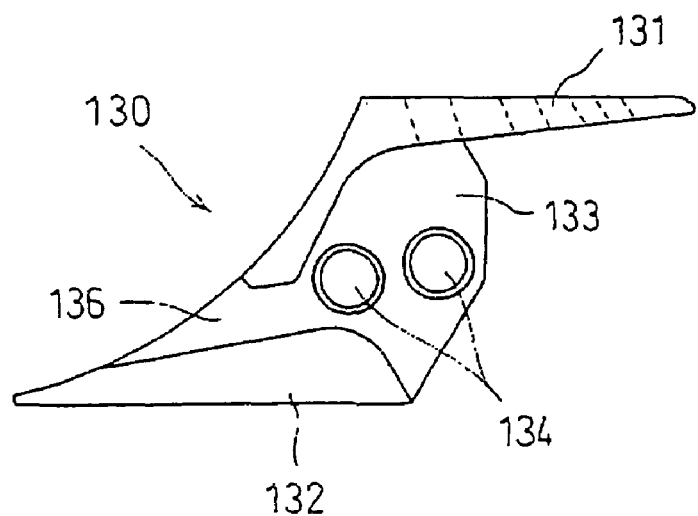
FIG. 20 is a side view of the above-mentioned chain guide member 130.
Figure 21:
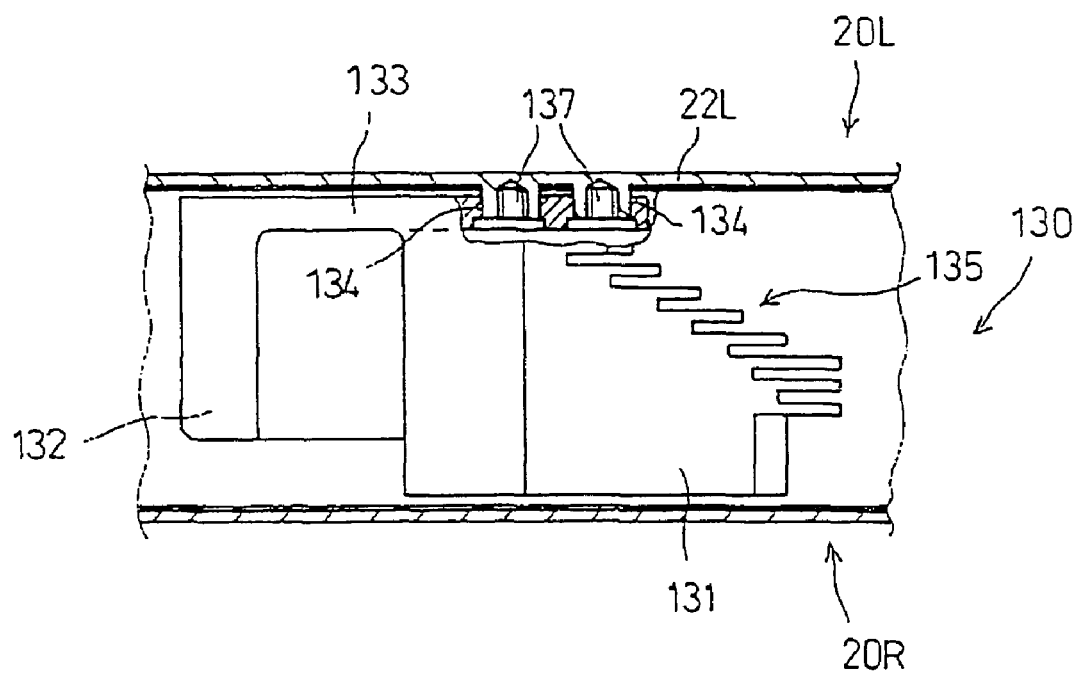
FIG. 21 is a top plan view of the chain guide member 130.

FIG. 19 is a right side view showing only members which are relevant to the transmission chain alignment in the inside of the casing 20 for indicating the relative positional relationship among the above-mentioned transmission sprocket wheel body 50, the drive sprocket wheel 41 and the chain guide member 130. FIG. 20 is a side view of the above-mentioned chain guide member 130, and FIG. 21 is an upper plan view of the chain guide member 130. The above-mentioned chain guide member 130 is made of synthetic resin and includes an upper guide portion 131 which is arranged above the chain path, a lower guide portion 132 which is arranged below the chain path, and a vertical connecting portion 133 which connects the above-mentioned both guide portions.

The upper guide portion 131 constitutes an upper movement restricting member of the transmission chain 58 and the lower guide portion 132 is a lower movement restricting member of the transmission chain 58, wherein the above-mentioned members are integrally connected by the vertical connecting portion 133 to constitute a single part. Two bolt holes 134 are formed in the vertical connecting portion 133. As shown in FIG. 21, the chain guide member 130 is fixed to the left reinforcing member 22L of the casing 20L by way of bolts 137 which are inserted into these bolt holes 134.

The chain guide member 130 is, as shown in FIGS. 4 and 19, arranged at a middle portion between the transmission sprocket wheel body 50 and the drive sprocket wheel 41, as viewed in a side view, the above-mentioned upper guide portion 131 is provided at a position where the upper guide portion 131 is overlapped to the multi-stage transmission sprocket wheels 50.

Transmission-chain-delivering-side surfaces of the upper and lower guide members 131, 132 are arranged parallel to each other as viewed in the transmission chain moving direction and are formed to have a width sufficient to allow the transmission chain 58 to pass between the upper and lower guide portion 131, 132.

As shown in FIG. 21, an oblique comb-teeth-like portion 135 is formed on a distal end of the upper guide member 131 on a transmission-sprocket-wheel-body 50 side. The respective comb teeth are inserted into gaps formed between tips of respective transmission sprocket wheels 51 to 57. At the time of changing over the transmission chain, the transmission chain 58 is surely removed from any one of the transmission sprocket wheels 51 to 57 with which the transmission chain 58 being meshed and the transmission chain 58 being returned in the direction toward the drive sprocket wheel 41.

As shown in FIG. 20, on a drive-sprocket-wheel side of the chain guide member 130, a throat portion 136 which narrowly restricts the vertical position of the passing transmission chain 58 is provided. This throat portion 136 is a portion which narrows a vertical width of the transmission chain path.

Although the explanation has been made previously with respect to the schematic structure of the casing 20 of the transmission T which includes the covers 21L, 21R, the reinforcing members 22L, 22R, the detailed structure of the above-mentioned casing 20 is further explained in conjunction with FIGS. 22 to 31 in addition to FIGS. 2 to 6.

Figure 22:
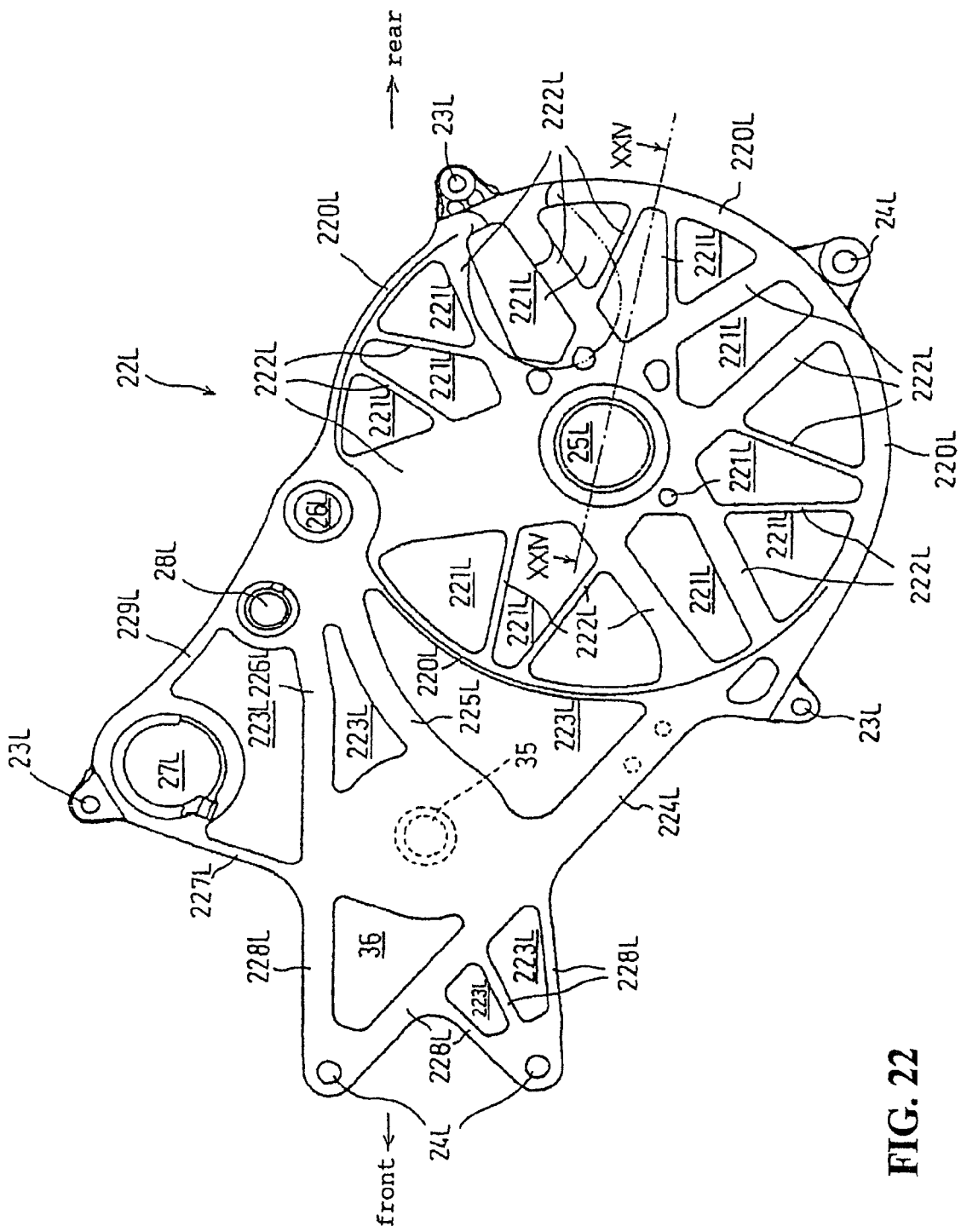
FIG. 22 is an outer side view of a left reinforcing member.
Figure 24:
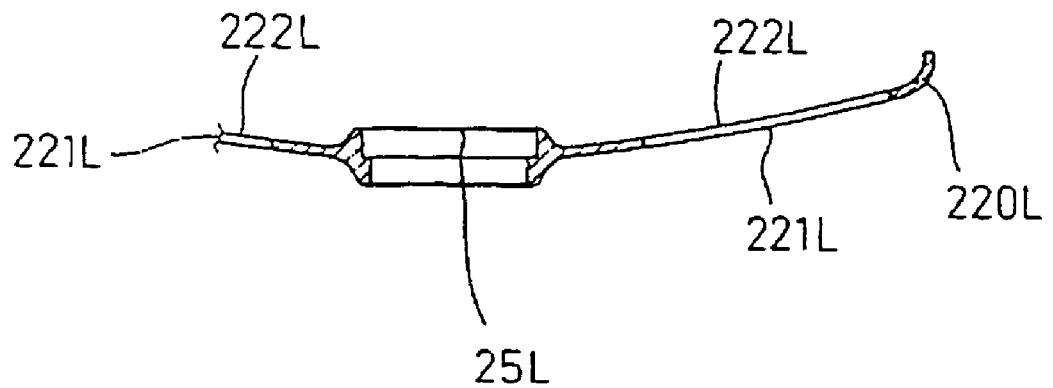
FIG. 24 is a cross-sectional view taken along a line XXIV-XXIV in FIG. 22.

With respect to the aluminium-alloy-made reinforcing member 22L, as shown in FIGS. 2, 22 and 24, three bolt holes 23L for mating and fastening the aluminum-alloy-made reinforcing member 22L to the reinforcing member 22R are formed in an outer peripheral portion thereof. Further, in the aluminum-alloy-made reinforcing member 22L, one mounting bolt hole 24L for mounting on a lower end of the main frame 2 and two mounting bolt holes 24L for mounting on a lower end of the down tube 3 are formed.

In a rear lower portion of the reinforcing member 22L, a crankshaft bearing hole 25L for pivotally mounting the crankshaft 11 is formed. At the same time, a pivot bearing hole 26L which allows the fitting of a pivot shaft 7 which vertically tiltably and pivotally supports a front end of the swing arm 8 on the main frame 2 therein is formed in an upper portion of the approximately center in the front-and-rear direction of the reinforcing member 22L. Further, a derailleur bearing hole 27L for reciprocally rotatably supporting the derailleur shaft 81 is formed in a front-side upper portion of the reinforcing member 22L. A peeping hole 28L is formed in a state wherein the peeping hole 28L is positioned at an approximately middle portion between the pivot bearing hole 26L and the derailleur bearing hole 27L. An output shaft pivoting plugged hole 35, indicated by a chain line, for pivotally mounting a left end of the output shaft 14 is formed in an inner surface of the reinforcing member 22L.

Further, on the reinforcing member 22L, a ring-like reinforcing portion 220L having a diameter which is substantially equal to a diameter of an outer periphery of the drive sprocket wheel 41 which is pivotally supported by way of the crankshaft 11 is formed to the crank bearing hole 25L. In a disc-like portion surrounded by the ring-like reinforcing portion 220L, a large number of opening portions 221L are formed in the circumferential direction. A peripheral portion of the crank bearing hole 25L and the ring-like reinforcing portion 220L are connected with each other by connecting portions 222L which are radially directed from the crank bearing hole 25L.

Also between a peripheral portion of the output shaft plugged hole 35 and peripheral portions of the ring-shaped reinforcing portion 220L of the crank bearing hole 25L, the pivot bearing hole 26L, the peeping hole 28L, the derailleur bearing hole 27L and two front-side bolt holes 24L, opening portions 223L are respectively formed. While the peripheral portion of the output shaft pivoting plugged hole 35 and the peripheral portions of the ring-shaped reinforcing portion 220L of the crank bearing hole 25L, the pivot bearing hole 26L, the peeping hole 28L, the derailleur bearing hole 27L and two front-side bolt holes 24L are connected with each other using connecting portions 224L, 225L, 226L, 227L, 228L. At the same time, the peripheral portion of the peeping hole 28L and the peripheral portion of the derailleur bearing hole 27L are connected to each other using a connecting portion 229L. Here, between the upper bolt hole 24L out of two front-side bolt holes 24L and the output shaft pivoting plugged hole 35, in place of an opening portion, an indentation portion 36 is formed which has an inner carved surface portion thereof.

Then, as shown in FIG. 24, the reinforcing member 22L has a thickness of 2 mm which is larger than a thickness of the cover 21L, while thicknesses of the peripheral portions of crank bearing hole 25L, the pivot bearing hole 26L and the peeping hole 28L are, respectively, set to 22 mm, 12 mm and 7 mm.

Figure 23:
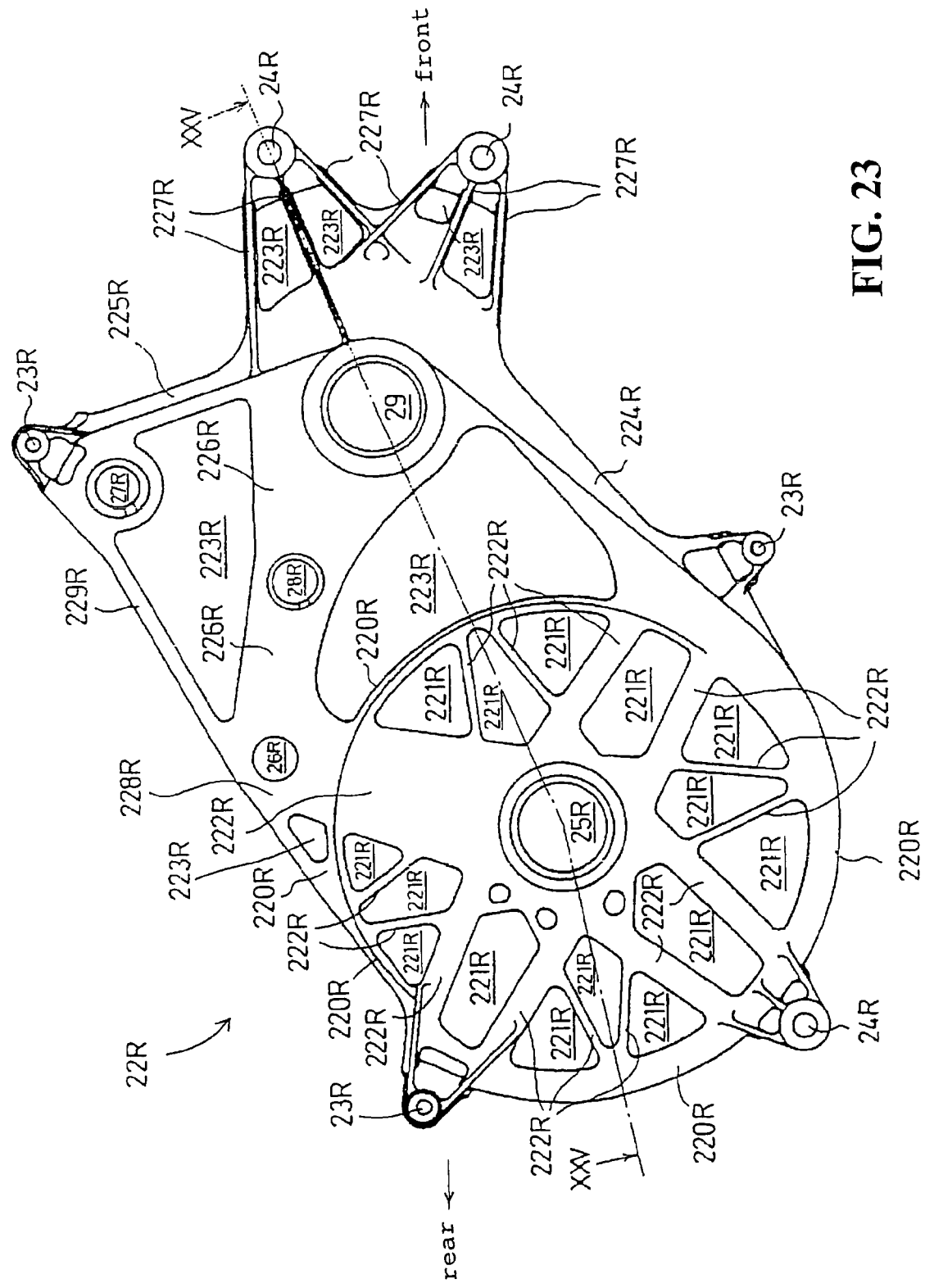
FIG. 23 is an outer side view of a right reinforcing member.
Figure 25:
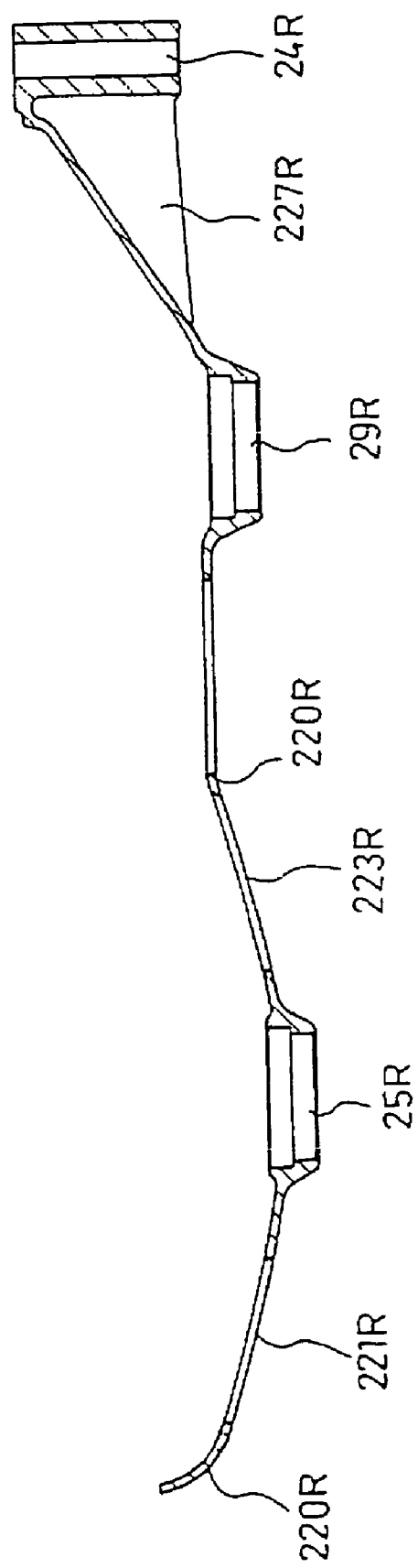
FIG. 25 is a cross-sectional view taken along a line XXV-XXV in FIG. 23.

With respect to the aluminium-alloy-made reinforcing member 22R, as shown in FIGS. 3, 23 and 25, three bolt holes 23R for mating and fastening the reinforcing member 22R to the reinforcing member 22L are formed in an outer peripheral portion thereof. Further, in the aluminum-alloy-made reinforcing member 22R, one mounting bolt hole 24R for mounting on the lower end of the main frame 2 and two mounting bolt holes 24R for mounting on the lower end of the down tube 3 are formed.

In a rear lower portion of the reinforcing member 22R, a crankshaft bearing hole 25R for pivotally mounting the crankshaft 11 is formed. At the same time, a pivot bearing hole 26R which allows the fitting of a pivot shaft 7 which vertically tiltably and pivotally supports the front end of the swing arm 8 on the main frame 2 therein is formed in an upper portion of the approximately center in the front-and-rear direction of the reinforcing member 22R. Further, a derailleur bearing hole 27R for reciprocally rotatably supporting the derailleur shaft 81 is formed in a front-side upper portion of the reinforcing member 22R. A peeping hole 28R is formed and positioned at an approximately a middle portion between the pivot bearing hole 26R and the output bearing hole 29. An output bearing hole 29 is formed for pivotally mounting a right end of the output shaft 14.

On the reinforcing member 22R, in the substantially same manner as the reinforcing member 22L, a ring-like reinforcing portion 220R, which has a diameter substantially equal to a diameter of the outer periphery of the drive sprocket wheel 41, is formed which is pivotally supported in the crankshaft bearing hole 25R by way of the crankshaft 11. In a disc-like portion which is surrounded by the ring-like reinforcing part 220R, a large number of opening portions 221R are formed in the circumferential direction. A peripheral portion of the crank bearing hole 25R and the ring-like reinforcing portion 220R are connected with each other using a connecting portion 222R which is radially directed from the crankshaft bearing hole 25R.

Also between a peripheral portion of the output shaft bearing hole 29 and respective peripheral portions of the ring-shaped reinforcing portion 220R of the crank bearing hole 25R, the derailleur bearing hole 27R, the pivot bearing hole 26R and two front-side bolt holes 24R, opening portions 223R are respectively formed. Opening portions 223R are formed in a peripheral portion of the ring-like reinforcing portion 220R and a peripheral portion of the pivot bearing hole 26R. The peripheral portion of the output shaft bearing hole 29 and the peripheral portions of the ring-shaped reinforcing portion 220R, the derailleur bearing hole 27R, the pivot bearing hole 26R and two front-side bolt holes 24R are connected with each other using connecting portions 224R, 225R, 226R and 227R. The peripheral portion of the opening portion 223R and the peripheral portion of the pivot bearing hole 26R are connected with each other using a connecting portion 228R. Further, the peripheral portion of the pivot bearing hole 26R and the peripheral portion of the derailleur bearing hole 27R are connected with each other using a connecting portion 229R.

As shown in FIG. 25, the reinforcing member 22R has a thickness of 2 mm which is larger than a thickness of the cover 21R, while thicknesses of the peripheral portions of crank bearing hole 25R, the pivot bearing hole 26R, the peeping hole 28R and the output bearing hole 29 are, respectively, set to 49 mm, 12 mm, 7 mm and 12 mm.

Figure 26:
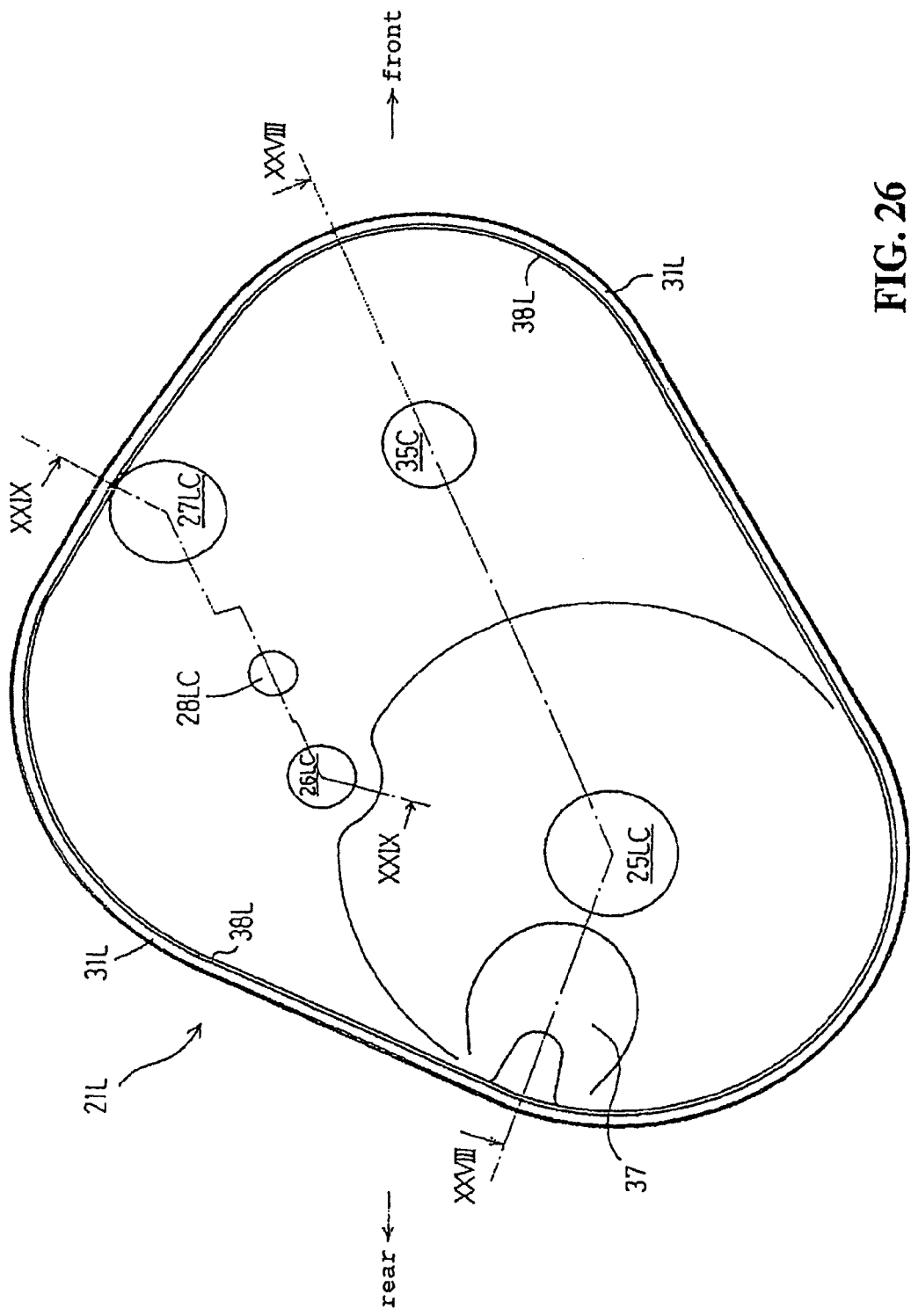
FIG. 26 is an inner side view of a left cover.
Figure 28:
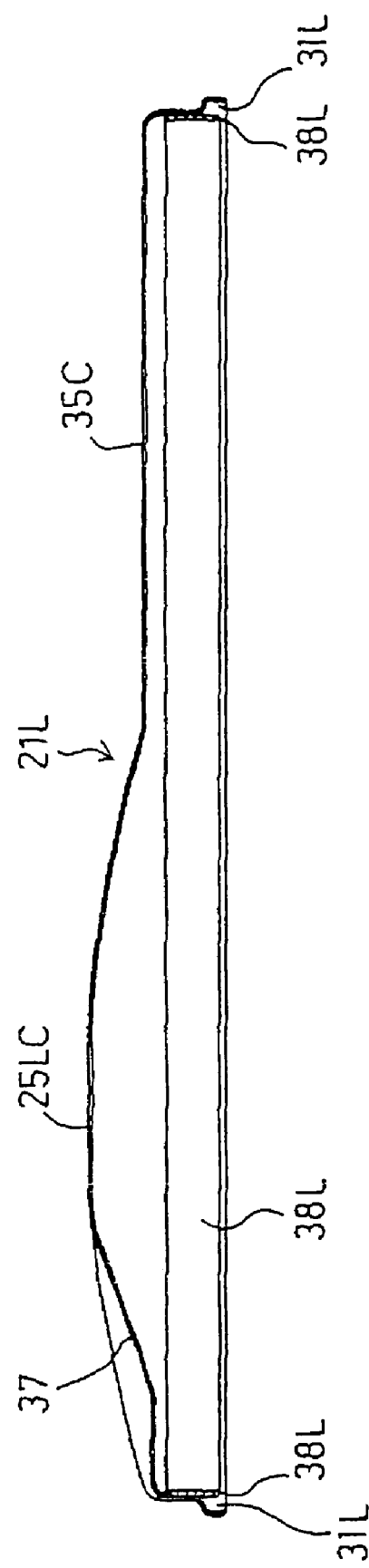
FIG. 28 is a cross-sectional view taken along a line XXVIII-XXVIII in FIG. 26.
Figure 29:
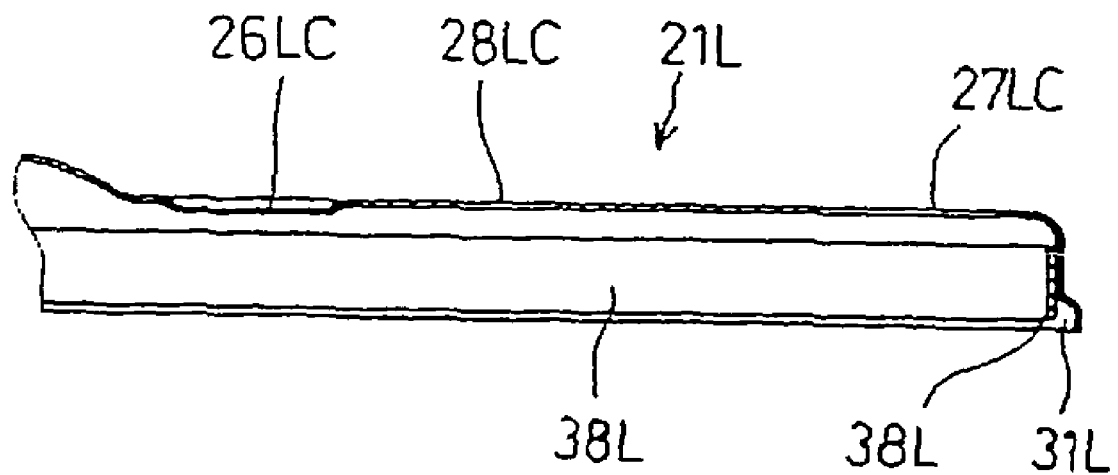
FIG. 29 is a cross-sectional view taken along a line XXIX-XXIX in FIG. 26.

The CFRP (Carbon Fiber Reinforced Plastic) made cover 21L and cover 21R, which are shown in FIG. 26, respectively, have a thickness of 1 mm. As shown in FIG. 26, in the cover 21L, a left crank bearing hole 25LC, a left pivot bearing hole 26LC, a left derailleur bearing hole 27LC, a left peeping hole 28LC, and an output shaft pivoting plugged hole 35C are formed in an aligning manner with the crankshaft bearing hole 25L. The pivot bearing hole 26L, the derailleur bearing hole 27L, the peeping hole 28L, and the output shaft pivoting plugged hole 35 are formed in the reinforcing member 22L as shown in FIG. 22. A recessed portion 37 having a horseshoe shape in a side view is formed between the left crank bearing hole 25LC and the bolt hole 23L arranged at a rear portion in FIG. 22. To an inner peripheral surface of the outer peripheral portion of the cover 21L, as shown in FIG. 28, a CFRP (Carbon Fiber Reinforced Plastic) made strip-like body 38L having a thickness of 1.5 mm and a width of 12 mm is integrally connected using an adhesive agent or the like. A left groove portion 31L is formed between an outer peripheral portion of the cover 21L and the strip-like body 38L. As mentioned previously, the cover 21L is integrally adhered to an inner surface of the reinforcing member 22L using an adhesive agent.

Figure 27:
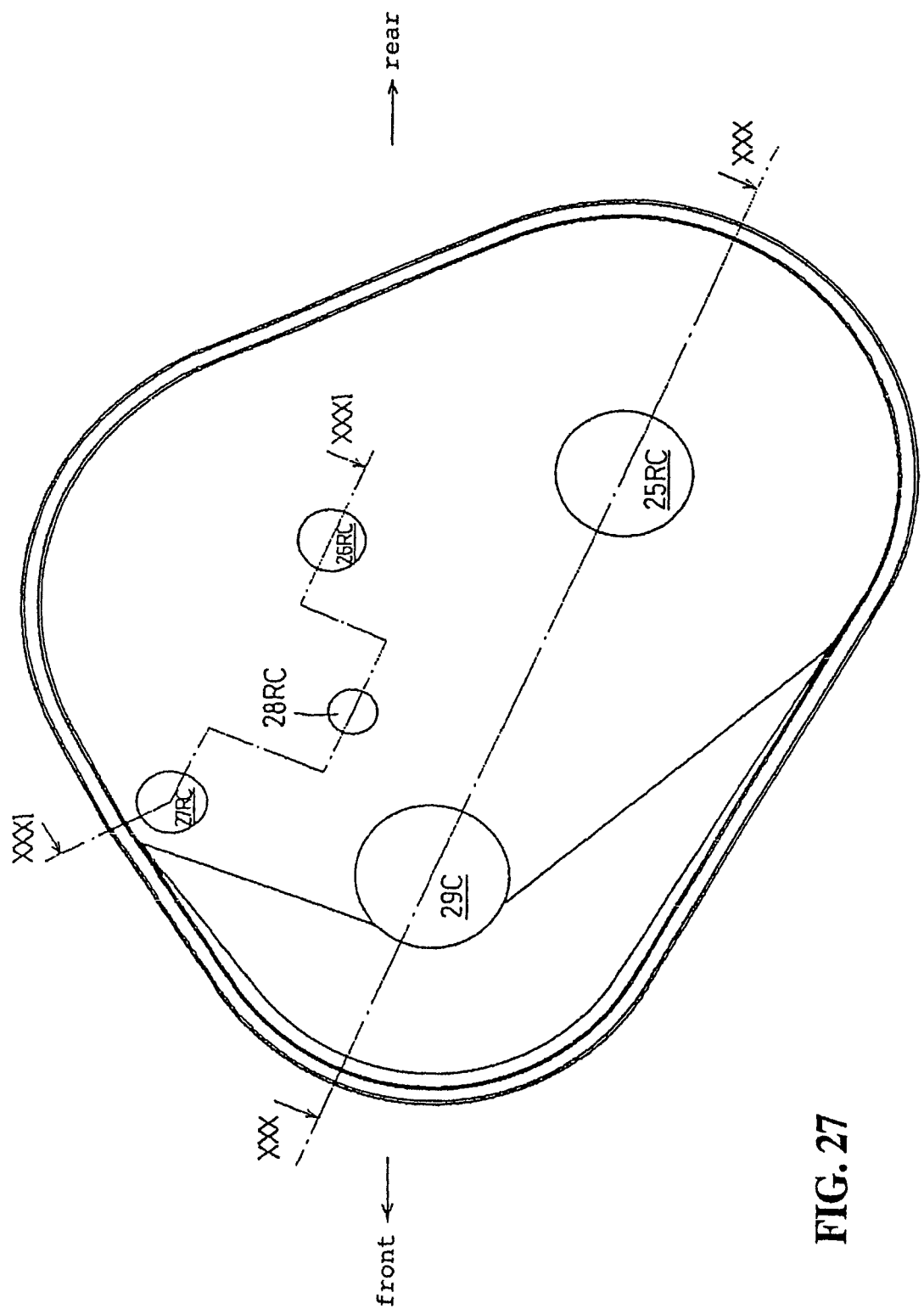
FIG. 27 is an inner side view of a right cover.
Figure 30:
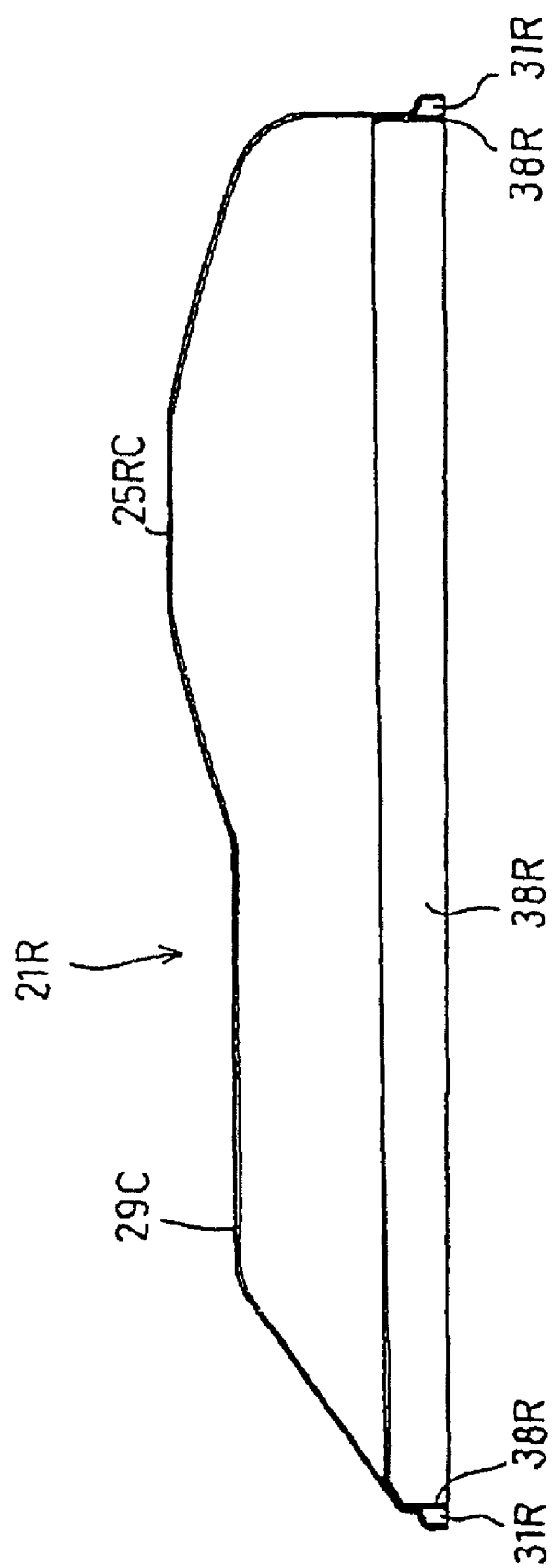
FIG. 30 is a cross-sectional view taken along a line XXX-XXX in FIG. 27.
Figure 31:
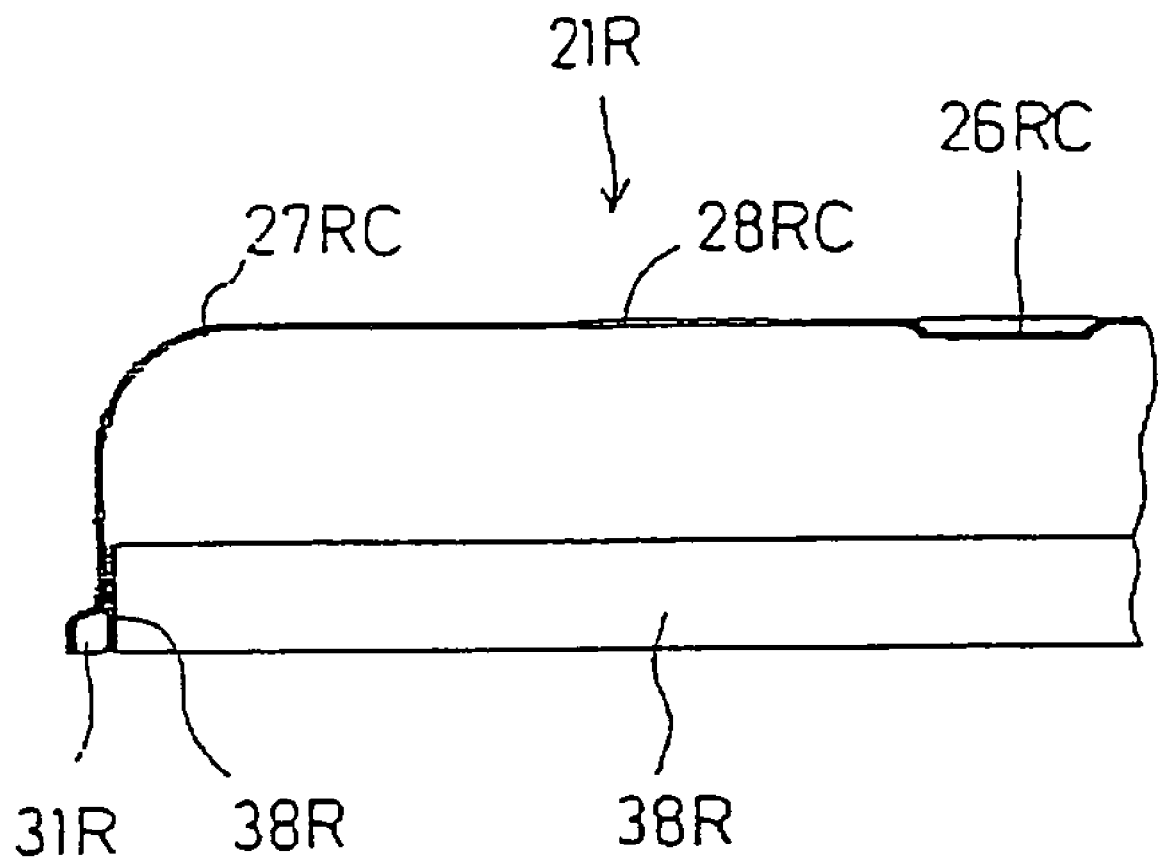
FIG. 31 is a cross-sectional view taken along a line XXXI-XXXI in FIG. 27.

In the CFRP (Carbon Fiber Reinforced Plastic) made cover 21R shown in FIG. 27, a right crank bearing hole 25RC, a right pivot bearing hole 26RC, a right derailleur bearing hole 27RC, a right peeping hole 28RC, and an output bearing hole 29C are formed in an aligning manner with the crank bearing hole 25R. The pivot bearing hole 26R, the derailleur bearing hole 27R, the peeping hole 28R, and the output shaft bearing hole 29 are formed in the reinforcing member 22R as shown in FIG. 23. To an inner surface of an outer peripheral surface of the cover 21R, as shown in FIG. 30, a CFRP (Carbon Fiber Reinforced Plastic) made strip-like body 38R having a thickness of 1 mm and a width of 12 mm is integrally connected using an adhesive agent or the like. A right groove portion 31R is formed between an outer peripheral portion of the cover 21R and the strip-like body 38R. As mentioned previously, the cover 21R is integrally adhered to an inner surface of the reinforcing member 22R using an adhesive agent or the like.

A sealing member 31 is inserted into the right groove portion 31R between the peeping hole 28R which is integrally formed with the cover 21R shown in FIG. 8 and an end peripheral portion of the cover 21R. The end periphery of the peeping hole 28L, which is integrally formed with the cover 21L, is brought into contact with the sealing member 31 over the entire periphery of the casing 20. Thus, the inside of the casing 20 is completely sealed.

Next, the manner of operation and advantageous effects of the embodiment having the above-mentioned constitution are hereinafter explained.

As indicated by the solid line in FIG. 4 and as shown in FIGS. 5, 8 and 12, in a state wherein the transmission sprocket wheel 57 is selected as a operating sprocket wheel among the group of the transmission sprocket wheels 51 to 57 by the derailleur 80 having the derailleur arm 82 provided at the above-mentioned first position, that is, when the seventh-speed position is selected as the transmission position, due to the crankshaft 11 which is rotated in the advancing direction P as the rider turns the pedals 12, the drive sprocket wheel 41 is rotatably driven in the advancing direction P by way of the one-way clutch 42 and the slide mechanism S.

Due to the drive sprocket wheel 41 which is rotatably driven in the advancing direction P, the transmission sprocket wheel 57, the output shaft 14 and the rear wheel drive sprocket wheel 15 are rotatably driven at the high-speed-side maximum transmission ratio which is determined by both sprocket wheels 41, 57 by way of the transmission chain 58.

The power of the crankshaft 11, which is rotatably driven by the rider, is transmitted to the output shaft 14 by way of the drive sprocket wheel 41, the transmission chain 58 and the transmission sprocket wheel 57. Thus, the power of the output shaft 14 is transmitted to the rear wheel Wr by way of the above-mentioned drive force transmission mechanism whereby the bicycle B travels at the seventh-speed position.

To change over the transmission position from the above-mentioned state which assumes the seventh-speed position using the derailleur 80, when the transmission manipulating member 61 is manipulated to select the low-speed-side transmission sprocket wheel, for example, the transmission sprocket wheel 51 as the operating sprocket wheel, due to the wire 62 which is moved leftwardly in the derailleur axial direction in FIG. 12, the manipulating pin 65 which is guided by the guide hole 81a is moved toward a left-side peripheral portion 61g of the guide hole 81a.

Here, the derailleur arm 82 and the guide pulley 86 which are integrally moved with the manipulating pin 65 are moved on the derailleur shaft 81 leftwardly along the axis in FIG. 12. At the same time, the derailleur arm 82 and the guide pulley 86 are rotated in the clockwise direction about the derailleur shaft 81 in FIG. 4. At a point in time when the derailleur arm 82 comes into contact with the washer 93 (see FIG. 13), the alignment mechanism assumes the first-speed position which is the transmission position indicated by a chain double-dashed line in FIG. 4.

Here, a state of the pin 61p is indicated by a chain double-dashed line in FIG. 10.

Thereafter, the winding of the transmission chain 58 which is moved leftwardly in FIG. 12 together with the guide pulley 86 is changed over from the transmission sprocket wheel 57 to the transmission sprocket wheel 51, sequentially, by way of the sprocket wheels 56 to 52 halfway. Thus, the transmission sprocket wheel 51 is drivably connected with the drive sprocket wheel 41 by way of the transmission chain 58 as shown in FIG. 13.

The drive sprocket wheel 41, which is movable in the crankshaft axial direction by the slide mechanism S shown in FIGS. 5 and 6, is moved in the axial direction of the crankshaft 11 due to a crankshaft-axial-directional component of tension of the transmission chain 58 and assumes a position indicated by a chain double-dashed line in FIG. 14.

Further, the tensioner pulley 105 assumes a position where the tensioner pulley 105 imparts a proper amount of tension to the transmission chain 58 using the tensioner spring 106. See a chain double-dashed line in FIG. 4.

Further, when the wire 62 is slackened by manipulating the transmission manipulating member 61 and any one of the high-speed-side transmission sprocket wheels 52 to 57 is selected which exhibit a higher speed than the transmission sprocket wheel 51 is selected as the operating sprocket wheel, the derailleur arm 82 is moved rightwardly due to the spring force of the compression coil spring 91. At the same time, the guide pulley 86 selects any one of the high-speed-side transmission sprocket wheels 52 to 57 and the winding of the transmission chain 58 is changed over to the above-mentioned selected operating sprocket wheel.

Also in this case, along with the movement of the derailleur arm 82, the drive sprocket wheel 41 is moved to the position which corresponds to the new transmission position in the crankshaft axial direction by way of the transmission chain 58.

Thereafter the bicycle B travels with the transmission ratio at the new transmission position.

In short, in changing over the transmission position, when the transmission manipulating member 61 is manipulated, the derailleur arm 82, and the guide pulley 86, the tensioner pulley 105 are moved to the desired transmission positions. Thereafter, the operating sprocket wheel selected from the group of sprocket wheels 51 to 57 and the drive sprocket wheel 41 on the crankshaft are connected with each other by way of the transmission chain 58 by means of the derailleur 80.

Due to the crankshaft-axial directional component of the tension of the transmission chain 58, the drive sprocket wheel 41 is moved along the crankshaft and assumes the position which corresponds to the above-mentioned selected operating sprocket wheel.

The wire 62 which is inserted into the guide hole 72d of the wire guide member 72 is wound around the guide roller 71 and is inserted into the inside of the derailleur shaft 81 from the small hole formed in the guide cap 64. Accordingly, irrespective of the direction that the wire 62 is inserted into the guide hole 72d from the outside, the wire 62 which is once inserted into the guide hole 72d is surely rightly wound around the guide roller 71 orthogonal to the support shaft 70, and is inserted into the derailleur shaft 81 while being accurately aligned with the center axis of the derailleur shaft 81 whereby the wire 62 can be smoothly advanced and retracted.

Due to the advancing and retracting of the wire 62 bought about by the manipulation of the transmission manipulating member 61, the manipulating pin 65 is moved in the inside of the derailleur shaft 81 in the axial direction together with the rollers 66, 66 by way of the connecting hook 67.

Since the pair of rollers 66, 66 which are pivotally supported on the manipulating pin 65 are respectively rotatably fitted in the guide holes 81a, 81a formed in the derailleur shaft 81, due to the movement of the manipulating pin 65 in the axial direction, the manipulating pin 65 per se is turned by being guided by the guide holes 81a, 81a. At the same time, the derailleur arm 82 and the guide pulley 86 can be turned integrally with the manipulating pin 65 with respect to the derailleur shaft 81 and can be moved in the axial direction simultaneously.

Since the manipulating pin 65 is fitted in the guide holes 81a, 81a by way of the rollers 66, 66, when the manipulating pin 65 is moved while being guided by the guide holes 81a, 81a, the rollers 66, 66 roll in the directions opposite to each other. Thus, the frictional resistance is largely reduced thus making the movement of the manipulating pin 65 smooth whereby the transmission operation can be performed smoothly.

Since the derailleur shaft 81 is not fixed to the casing 20 and is configured to be rotatable and biased by the balancing spring 92, even when an excessive torque acts on the derailleur shaft 81 from the manipulating pin 65 by way of the derailleur arm 82, the derailleur shaft 81 is rotated so that the excessive torque is alleviated.

Since the torque which acts on the derailleur shaft 81 due to the tension of the transmission chain 58 acts on the bearing cap 68 by way of the balancing spring 92, the projection 68c of the bearing cap 68 is constantly pushed to the distal end of the adjusting bolt 73.

Accordingly, when the adjusting bolt 73 is advanced or retracted due to the rotation of the adjusting bolt 73, the bearing cap 68 is rotated about the center axis of the derailleur shaft 81 by way of the projection 68c of the bearing cap 68 which is fitted in the derailleur bearing hole 27L.

The rotation of the bearing cap 68 rotates the derailleur shaft 81 by way of the balancing spring 92 so as to adjust the rotating angle of the derailleur shaft 81.

The adjustment of the rotating angle of the derailleur shaft 81 is performed by peeping the peeping hole 28L formed in the left casing 20L in a state that the derailleur arm 82 is arranged closest to the left casing 20L as shown in FIG. 13 when the transmission ratio is a minimum. Accordingly, the user can easily observe the guide pulley support shaft 87 and can easily adjust the guide pulley support shaft 87.

Further, in this embodiment, when the stopper bolt 75 is threadedly engaged with the stopper bolt hole 30(see FIG. 3) which is formed in the vicinity of the derailleur bearing hole 27R formed in the above-mentioned right reinforcing member 22R, the distal end of the stopper bolt 75 which is threadedly engaged in parallel to the derailleur shaft 81 projects into the inside of the casing 20 and can come into contact with the proximal end portion 84a of the second derailleur arm 84. See FIG. 8. More specifically, based on a threaded engagement amount of the stopper bolt 75, it is possible to adjust a rightward movable limit of the derailleur arm 82.

Further, since the peeping hole 28R is formed in the above-mentioned right casing 20R, when the derailleur arm 82 is accurately positioned at the axial position corresponding to the transmission sprocket wheel 57 of the seventh-speed (maximum transmission ratio) having the minimum outer diameter and at the given turning position as shown in FIG. 13, it is possible to make the guide pulley support shaft 87 of the guide pulley 86 and the center axis coaxially aligned with each other. See a chain double-dashed line in FIG. 3.

Accordingly, as shown in FIG. 3, it is possible to adjust the threaded engagement state of the stopper bolt 75 while peeping the peeping hole 28R formed in the right casing 20R such that the rotational angle of the derailleur arm 82 is stopped at a given angle when the transmission ratio is set to a maximum value by manipulating the transmission manipulating member 61 after the above-mentioned adjustment.

When the stopper bolt 75 is advanced or retracted due to the rotational manipulation thereof, it is possible to move the derailleur arm 82 which is biased by the compression coil spring 91 in the axial direction. Due to this axial movement of the derailleur arm 82, the derailleur arm 82 is guided and turned in the guide hole 81a formed in the derailleur shaft 81 by way of the manipulating pin 65. Thus, it is possible to perform the adjustment of the rotating angle by peeping the peeping hole 28R.

In this manner, it is possible to accurately set the axial position of the derailleur arm 82 when the transmission ratio is set to the maximum value by restricting the axial position using the stopper bolt 75.

After completion of this setting, the cap 97 is fitted into the peeping hole 28R to plug the peeping hole 28R.

Due to the manipulation of the transmission manipulating member 61 described above, it is possible to perform an adjustment such that the derailleur arm 82 and the guide pulley 86 are, respectively, turned to the given turning positions corresponding to the respective axial positions corresponding to the transmission sprocket wheels 51 to 57. Thus, the transmission operation can be smoothly performed.

More specifically, when the transmission manipulating member 61 is manipulated and the manipulating pin 65 which is connected to the wire 62 is moved in the axial direction to perform the changeover of the winding of the transmission chain 58 to the low speed (or the high speed) side, the manipulating pin 65 is guided by the guide hole 81a formed in the derailleur shaft 81 whose rotational angle is determined by the balancing of the torque and is turned together with the derailleur arm 82 and, at the same time, is moved in the axial direction. Accordingly, the transmission chain 58 which is guided by the guide pulley 86 which moves along with the derailleur arm 82 is wound around the transmission sprocket wheel which is alternatively selected out of the group of the transmission sprocket wheels 51 to 57 in response to the transmission position whereby the drive sprocket wheel 41 and the above-mentioned transmission sprocket wheel are drivably connected with each other by the transmission chain 58.

As described above, the adjustment of the derailleur shaft 81 and the setting of the axial position of the derailleur arm 82 can be performed from the outside without disassembling the casing 20 after assembling the transmission T to the frame F. Thus, the assembling of the transmission T is facilitated.

Further, since the peeping holes 28L, 28R are plugged with the caps 96, 97, the inside of the casing 20 is hermetically sealed. Thus, the alignment mechanism hardly receives any disturbance.

Here, the peeping holes 28L, 28R, which constitute peeping windows formed in the casing 20, may be formed by fitting a transparent member made of glass or the like therein. In this case, it is possible to maintain the sealing performance and, at the same time, it is no longer necessary to perform an operation to remove and fit the cap each time.

The bicycle B on which the transmission of the present invention is mounted is a downhill bicycle which is used in a competition in which players compete against time spent for descending an unpaved course which includes high-speed corners and jump sections in a woodland path or the like. Accordingly, when the bicycle B turns a sharp curve laterally, the transmission chain 58 which is wound around the drive sprocket wheel body 40 and the transmission sprocket wheel body 50 receives a centrifugal force in the direction opposite to the direction that the bicycle B turns. Thus, the transmission chain 58 is liable to be removed from the teeth of the drive sprocket wheel 41 of the drive sprocket wheel body 40 in the centrifugal direction. Alternatively, the bicycle B is vigorously jolted vertically due to the unevenness of a traveling surface at the time of traveling. Thus, the transmission chain 58 is liable to be removed from the drive sprocket wheel 41. However, as shown in FIGS. 5 and 14, the chain guides 47 are integrally formed on both sides of the outer peripheral portion of the drive sprocket wheel 41. Thus, it is possible to preliminarily prevent the transmission chain 58 from being removed from the drive sprocket wheel 41 due to the chain guides 47.

Further, due to the tension of the transmission chain 58 which is wound around the drive sprocket wheel 41, the drive sprocket wheel body 40 receives a confining force which prevents the movement of the drive sprocket wheel body 40 in the axial direction of the crankshaft 11. In this case, when the centrifugal force, which is generated when the bicycle B travels the sharp curve, is large, there may be a case wherein the drive sprocket wheel 41 and the outer sleeve 45 which constitute axially movable portions of the drive sprocket wheel body 40 may move in the centrifugal force direction by overcoming the confining force. However, even in such a case, as shown in FIG. 14, the drive sprocket wheel position setting member 120 is integrally formed with the derailleur arm 82 whose axial position is set by the derailleur 80, the drive sprocket wheel movement restricting member 121 is integrally mounted on the right side of the drive sprocket wheel 41, and the drive sprocket wheel position setting member 120 is positioned between the drive sprocket wheel 41 and the drive sprocket wheel movement restricting member 121. Accordingly, when the drive sprocket wheel 41, the outer sleeve 45 and the drive sprocket wheel movement restricting member 121 which constitute the movable portions of the drive sprocket wheel body 40 are made to move leftwardly, for example, due to the above-mentioned centrifugal force, and the drive sprocket wheel movement restricting member 121 is brought into contact with the drive sprocket wheel position setting member 120. Thus, the leftward movement of the movable portions of the drive sprocket wheel body 40 is obstructed. Further, when the movable portions of the drive sprocket wheel body 40 are made to move rightwardly due to the above-mentioned centrifugal force, the chain guide members 47 which are integrally formed with the drive sprocket wheel 41 are brought into contact with the drive sprocket wheel position setting member 120. Thus, the rightward movement of the movable portions of the drive sprocket wheel body 40 is obstructed.

Due to the slide restriction structure which includes the drive sprocket wheel position setting member 120 and the drive sprocket wheel movement restricting member 121, the axial position of the drive sprocket wheel 41 is constantly restricted within the given range with respect to the guide pulley 86 and the tensioner pulley 105. Thus, the transmission chain 58 is returned along the rotational surfaces of the drive sprocket wheel 41, and the tensioner pulley 105 and the given sprocket of the transmission sprocket wheels 51 to 57. Thus, the transmission chain 58 is stably meshed with these sprocket wheels. As a result, it is possible to surely prevent the removal of the transmission chain 58 from these sprocket wheels and, at the same time, the transmission chain 58 can be smoothly returned whereby the high transmission efficiency is obtained.

Thereafter, drive sprocket wheel position setting member 120 which is branched from the outer peripheral portion of the flattened cylindrical portion 84c to the radial direction is curved in the clockwise direction in FIG. 4. Thus, even when the derailleur arm 82 of the derailleur 80 is tilted in a wide range as indicated by a solid line and a chain double-dashed line in FIG. 4 corresponding to the change of the radii of the transmission sprocket wheel 51 having the maximum diameter and transmission sprocket wheel 57 having the minimum diameter, there is no possibility that the drive sprocket wheel position setting member 120 collides with the pivot shaft 7.

Further, since the drive sprocket wheel position setting member 120 is curved as mentioned above, there exists no substantial difference between the engagement state of the drive sprocket wheel 41 and the ring-like drive sprocket wheel movement restricting member 121 in a state indicated by the solid line in FIG. 4 where the derailleur arm 82 is substantially directed to the crankshaft 11 which constitutes the center of rotation of the drive sprocket wheel 41 and the engagement state of the drive sprocket wheel 41 and the ring-like drive sprocket wheel movement restricting member 121 in a state where the derailleur arm 82 is indicated by the chain double-dashed line in FIG. 4. As a result, the drive sprocket wheel position setting member 120 can maintain a fixed contact state with respect to the drive sprocket wheel 41 and the drive sprocket wheel movement restricting member 121.

Further, since the outer peripheral portion 126 of the drive sprocket wheel movement restricting member 121 is formed in a circular ring shape, the contact state of the drive sprocket wheel movement restricting member 121 with respect to the drive sprocket wheel position setting member 120 is fixed.

Still further, since the drive sprocket wheel movement restricting member 121 has an inversely V-shaped connecting portion 127 which extends from the ring-like outer peripheral portion 126 to the center direction integrally formed thereon, the drive sprocket wheel movement restricting member 121 can be made light-weighted.

In the bicycle B which mounts the transmission T thereon, the rotational force of the crankshaft 11 in the normal direction P which is generated by rotating the pedals 12 rotatably drives the crankshaft 11, the drive sprocket wheel 41, the transmission chain 58, the transmission sprocket wheel body 50, the output shaft 14, the rear wheel drive sprocket wheel 15, the rear wheel drive chain 17, the rear wheel driven sprocket wheel 16, and the rear wheel Wr in this order. Thus, the rear wheel Wr is driven and the bicycle B is advanced. In this case, the one-way clutch 42 is provided relative to the drive force transmission path and the one-way clutch 42 is arranged between the crankshaft 11 and the drive sprocket wheel 41. Thus, when the crankshaft 41 is rotated in the reverse direction, the reverse rotation of the crankshaft 11 is not transmitted to the drive sprocket wheel 41 and succeeding parts in the above-mentioned order.

When the crankshaft 11 is reversely rotated or stopped during the traveling of the bicycle, the bicycle advances with inertia. More particularly in descending an inclined ground, the bicycle continues the advancing. Thus, the rotation of the rear wheel Wr of the bicycle is continued. At this point of time, the rotation of the rear wheel Wr of the bicycle is directly transmitted to the transmission sprocket wheel body 50 in the following order of the rear wheel Wr, the real wheel driven sprocket wheel 16, the rear wheel drive chain 17, the rear wheel drive sprocket wheel 15, the output shaft 14 and the transmission sprocket wheel body 50.

The transmission chain 58 extends between and is wound around the transmission sprocket wheel body 50 and the drive sprocket wheel 41, wherein the drive sprocket wheel 41 which does not yet receive the drive force from the crankshaft 11 is in a state wherein the drive sprocket wheel 41 is passively rotatable and the tension is applied to the transmission chain 58 due to the balance between the tensioner spring 106 of the chain tensioner 100 and the balancing spring 92. However, when the traveling road is undulated at a small pitch or when the rider strongly steps on the pedals 39 and, thereafter, rapidly stops the stepping of the pedals 39, as shown in FIG. 19, the transmission chain 58 is pushed into the reel-in side of the drive sprocket wheel body 40 from the lower reel-out side of the transmission sprocket wheel body 50. Thus, the transmission chain 58 is deflected or slackened thus giving rise to a case wherein the meshing of the drive sprocket wheel 41 with the reel-in side of the drive sprocket wheel 41 cannot be performed smoothly.

The chain guide member 130 is provided for preventing such a seizure of the transmission chain 58. In the transmission T which includes the chain guide member 130 of this embodiment, as shown in FIG. 19, it is possible to allow the transmission chain 58 which is slackened on the transmission-sprocket-wheel-body-50 side of the chain guide member 130 to be aligned in a straight line at the throat portion 136 and to smoothly enter the drive sprocket wheel 41.

Accordingly, when the bicycle descends an unpaved course such as high-speed corners, jump sections and the like arranged in woodland or the like, the bicycle B repeats the violent up-and-down movement. Thus, the vibration attributed to the inertial in the up-and-down direction is imparted. In the bicycle on which the chain guide member is mounted, even when the violent up-and-down movement takes place in the state in which the transmission chain 58 is deflected or slackened in the above-mentioned manner, it is possible to prevent the entrance of the drive sprocket wheel from being clogged with the transmission chain 58 due to the inertial vibration of the transmission chain in the up-and-down direction.

As shown in FIG. 21, the chain guide member 130 is fixed to the left reinforcing member 22L of the casing 20L using bolts 137 which are inserted into the bolt holes 134 and the chain guide member 130 is made of synthetic resin. Thus, the chain guide member 130 can be manufactured at a low cost and is light-weighted.

The chain guide member 130 is, as shown in FIGS. 4 and 19, arranged between the transmission sprocket wheel body 50 and the drive sprocket wheel 41.

The transmission-chain-delivering-side surfaces of the upper and lower guide members 131, 132 are arranged parallel to each other as viewed in the transfer chain moving direction and are formed to have a sufficient width. Thus, when the transmission chain 58 is moved in the axial direction of the output shaft at the time of changing over the winding of the transmission chain 58, it is possible to smoothly guide the transmission chain 58.

As shown in FIG. 21, the oblique comb-teeth-like portion 135 is formed on the distal end of the upper guide member 131 on the transmission-sprocket-wheel-body-50 side and the respective comb teeth are inserted into gaps formed between the respective overlapped transmission sprocket wheels 51 to 57. Accordingly, even at the time of changing over the winding of the transmission chain, it is possible to ensure the restriction of the upward movement of the transmission chain 58. Thus, the transmission chain 58 can be smoothly returned in the direction toward the drive sprocket wheel 41.

As shown in FIG. 20, on the drive-sprocket-wheel side of the chain guide member 130, the throat portion 136 which narrowly restricts the vertical position of the passing transmission chain 58 is provided. The transmission chain which is delivered from the throat portion can arrive at the tip position of the drive sprocket wheel 41 in a tangential manner.

With respect to the reinforcing members 22L, 22R of the casing 20, the thicknesses of peripheral portions of the bolt holes 23L, 23R, 24L, 24R are large, that is, 22 mm to 49 mm. Thus, it is possible to firmly connect the reinforcing members 22L, 22R to each other.

Further, in the reinforcing members 22L, 22R, the thicknesses of the peripheral portions of the crank bearing holes 25L, 25R, the pivot bearing holes 26L, 26R, the derailleur bearing holes 27L, 27R, the peeping holes 28L, 28R and the output bearing hole 29, the output shaft pivoting plugged hole 35 and the bolt holes 23L, 23R, 24L, 24R which support the pivot shaft 7, the crankshaft 11, the output shaft 14 and the derailleur shaft 81 are set larger than a thickness of 2 mm of other portions, that is, 4 mm to 37 mm. Thus, it is possible to allow the reinforcing members 22L, 22R to firmly bear an external force which acts on the pivot shaft 7, the crankshaft 11, the output shaft 14 and the derailleur shaft 81 without generating the deformation of the reinforcing members 22L, 22R.

Further, in portions of the reinforcing members 22L, 22R where a large stress is not generated, opening portions 221L, 221R and opening portions 223L, 223R are formed so as to reduce the weight. Further, the thicknesses are decreased at the output shaft pivoting plugged hole 35 and the indentation portion 36. Accordingly, the reinforcing members 22L, 22R are light-weighted in spite of the fact that the reinforcing members 22L, 22R have the sufficient strength.

Further, the covers 21L, 21R are configured to cover the whole outer surface of the casing 20 and are respectively integrally connected with the reinforcing members 22L, 22R. Thus, the rigidity of the whole casing 20 is remarkably enhanced and, at the same time, the reinforcing members 22L, 22R have a shell shape. Accordingly, torsional strength and the rigidity of the casing 20 can be enhanced.

Further, with respect to the rigidity of the whole casing 20, the reinforcing members 22 occupy 68 to 76% and the covers 21 occupy 24 to 32%. With respect to the strength of the maximum stress generating portion of the casing 20, the reinforcing members 22 bear the strength at a rate of 72 to 75% and the covers 21 bear the strength at a rate of 25 to 28%.

The left groove portion 31L is formed between the outer peripheral portion of the cover 21L and the strip-like body 38L and, as described previously, the cover 21L is integrally adhered to the inner surface of the reinforcing member 22L using an adhesive agent or the like. Thus, it is ensured that the inside of the casing 20 is hermetically sealed and the intrusion of dust, water and the like into respective parts in the inside of the casing 20 can be preliminarily prevented.

Further, although the thickness of the covers 21 is 1 mm in this embodiment, the thickness of the covers 21 may fall within a range of 0.7 mm to 1.5 mm. However, by setting the thickness of the covers 21 to 1 mm, it is possible to make the covers 21 light-weighted while ensuring a sufficient strength and rigidity. Further, it is possible to allow the covers 21 to cope with the traveling conditions in a wide range. Still further, although the thickness of the reinforcing members 22 is 2 mm, the thickness of the reinforcing members 22 may fall within a range of 1.0 mm to 2.5 mm.

Further, although the covers 21 are made of CFRP (carbon fiber reinforced plastic), the covers 21 may be formed of plastic which is reinforced with fibers other than carbon fibers.

Still further, although the reinforcing members 22 are made of an aluminum alloy, the reinforcing member 22 may be made of only aluminum or aluminum magnesium alloy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission casing for a bicycle, comprising:
   a left casing and a right casing, each casing comprising:
   a metal reinforcing member, each reinforcing member having an inner surface and an outer surface opposite the inner surface, the metal reinforcing member forming an exterior surface of the casing;

a cover member which is integrally laminated to the inner surface of the reinforcing member so as to form a sidewall having an inner layer and an outer layer, the cover member forming an interior surface of the casing; and an aperture for allowing the passage of a transmission shaft, wherein a thickness of the cover member is set to a value which falls within a range of 0.7 to 1.5 mm and the reinforcing member has at least a portion thereof formed thicker than the cover member, wherein the transmission casing is divided into the left and right casings by using an approximately center portion of the transmission casing in a bicycle width direction as a boundary, the left and right divided transmission casings are integrally coupled to each other using screw members at a plurality of portions on an outer peripheral portion of the transmission casing and, at the same time, the transmission casing is coupled to a body of the bicycle at a plurality of given portions out of the plurality of portions, and wherein fiber-reinforced-plastic strip bodies are attached to the whole circumference of inner surfaces of outer peripheries of the cover members of the left and right divided transmission casings;

a sealing member is fitted in a groove portion which is formed between an outer peripheral portion of the cover member in one of the left and right casings and an outer peripheral portion of the fiber-reinforced-plastic strip body; and an outer peripheral portion of the cover member in the other casing of the left and right divided transmission casings is brought into contact with the sealing member.

2. The transmission casing for a bicycle according to claim 1, wherein the reinforcing member is made of aluminum.

3. The transmission casing for a bicycle according to claim 1, and further including at least one peeping hole formed in said reinforcing member for permitting a viewing of the interior of said transmission casing while maintaining a seal for closing said transmission casing.

4. The transmission casing for a bicycle according to claim 1, wherein the cover member is formed of carbon fiber reinforced plastic.

5. A transmission casing for a bicycle in which a plurality of transmission shafts are supported by the transmission casing, comprising:

a metal reinforcing member for forming the transmission casing;

an alloy for supporting shaft portions of the plurality of transmission shafts; and a cover member which is integrally laminated to an inner surface of the reinforcing member so as to hermetically seal the transmission, wherein fiber-reinforced-plastic strip bodies are attached to the whole circumference of inner surfaces of outer peripheries of the cover members of the left and right casings;

a sealing member is fitted in a groove portion which is formed between an outer peripheral portion of the cover member of one of the left casing and the right casing and an outer peripheral portion of the fiber-reinforced-plastic strip body; and an outer peripheral portion of the cover member of an other of the left casing and the right casing is brought into contact with the sealing member.

6. The transmission casing for a bicycle according to claim 1, wherein the reinforcing member provides 68 to 76% of the rigidity and 72 to 75% of the strength of the case and the cover member provides 24 to 32% of the rigidity and 25 to 28% of the strength of the case.

7. A transmission casing for use with a bicycle, comprising:

an exterior wall enclosing a transmission, the exterior wall comprising;

a reinforcing member for forming an exterior surface of the transmission casing, the reinforcing member having an inner surface forming an interior of the transmission casing;

a cover member forming an interior surface of the transmission casing integrally laminated to the inner surface of the reinforcing member for hermetically sealing the transmission, the cover member being within the interior of the transmission casing increasing the rigidity of the casing;

wherein the reinforcing member operatively supports a plurality of transmission shafts; and the cover member provides a residual rigidity for preventing the deformation of the transmission casing, wherein the transmission casing is divided into left and right transmission casings using an approximately center portion of the transmission casing in a bicycle width direction as a boundary, the left and right divided transmission casings are integrally coupled to each other using screw members at a plurality of portions on an outer peripheral portion of the transmission casing and, at the same time, the transmission casing is coupled to a body of the bicycle at a plurality of given portions out of plurality of portions, and wherein fiber-reinforced-plastic strip bodies are attached to the whole circumference of inner surfaces of outer peripheries of the cover members of the left and right divided transmission casings;

a sealing member is fitted in a groove portion which is formed between an outer peripheral portion of the cover member in either one of the left and right divided transmission casings and an outer peripheral portion of the fiber-reinforced-plastic strip body; and an outer peripheral portion of the cover member in another divided transmission casing of the left and right divided transmission casings is brought into contact with the sealing member.

8. The transmission casing for a bicycle according to claim 7, wherein a thickness of the cover member is set to a value which falls within a range of 0.7 to 1.5 mm and the reinforcing member has at least a portion thereof formed thicker than the cover member.

9. The transmission casing for a bicycle according to claim 7, wherein the reinforcing member is made of aluminum.

10. The transmission casing for a bicycle according to claim 7, and further including at least one peeping hole formed in said reinforcing member for permitting a viewing of the interior of said transmission casing while maintaining a seal for closing said transmission casing.

11. The transmission casing for a bicycle according to claim 7, wherein the cover member is formed of carbon fiber reinforced plastic.

12. The transmission casing for a bicycle according to claim 7, wherein the reinforcing member provides 68 to 76% of the rigidity and 72 to 75% of the strength of the case and the cover member provides 24 to 32% of the rigidity and 25 to 28% of the strength of the transmission case.

* * * * *